US006625844B2

(12) United States Patent
Savage

(10) Patent No.: US 6,625,844 B2
(45) Date of Patent: Sep. 30, 2003

(54) MODULAR VACUUM SYSTEM AND METHOD

(76) Inventor: Robert E. Savage, 4049 Locustwood Dr., Dayton, OH (US) 45429

( * ) Notice: Subject to any disclaimer, the term of this patent is extended or adjusted under 35 U.S.C. 154(b) by 0 days.

(21) Appl. No.: 09/861,610

(22) Filed: May 18, 2001

(65) Prior Publication Data

US 2003/0041407 A1 Mar. 6, 2003

(51) Int. Cl.$^7$ ................................................ A47L 11/30
(52) U.S. Cl. ........................................ 15/320; 15/321
(58) Field of Search .......................... 15/320, 321, 353, 15/319

(56) References Cited

U.S. PATENT DOCUMENTS

| | | | |
|---|---|---|---|
| 3,774,260 A | * 11/1973 | Emus, Jr. ...................... 15/321 |
| 4,087,881 A | * 5/1978 | Bates ........................... 15/422.2 |
| 4,153,968 A | * 5/1979 | Perkins ........................ 15/321 |
| 4,216,563 A | 8/1980 | Cyphert | |
| 4,226,000 A | 10/1980 | Tribolet | |
| 4,287,635 A | 9/1981 | Jacobs | |
| 4,287,636 A | 9/1981 | Brazier | |
| 4,458,377 A | 7/1984 | Frohbieter | |
| 4,531,257 A | 7/1985 | Passien | |
| 4,580,309 A | 4/1986 | Ogden | |
| 4,686,735 A | 8/1987 | Soeffker et al. | |
| 4,723,337 A | * 2/1988 | Ellison et al. ............... 15/422.2 |
| 4,735,639 A | 4/1988 | Johnstone | |
| 4,800,612 A | 1/1989 | Valentine | |
| 4,809,396 A | 3/1989 | Houser | |
| 4,862,551 A | * 9/1989 | Martinez et al. ............... 15/321 |
| 4,934,017 A | 6/1990 | Kent | |
| 5,147,467 A | 9/1992 | Virtue | |
| 5,165,139 A | 11/1992 | Oxman | |
| 5,263,223 A | * 11/1993 | Fiegel et al. .................. 15/321 |
| 5,287,588 A | * 2/1994 | Gurstein et al. ............... 15/321 |
| 5,430,910 A | 7/1995 | Wiley | |
| 5,658,114 A | 8/1997 | Mahler | |
| 5,836,046 A | * 11/1998 | Huffman et al. ............... 15/321 |
| 6,125,499 A | 10/2000 | Downey | |
| 6,182,328 B1 | 2/2001 | Roden | |

* cited by examiner

Primary Examiner—Terrence R. Till
(74) Attorney, Agent, or Firm—Jacox Meckstroth & Jenkins

(57) ABSTRACT

A system and method for vacuuming an area is provided. The system and method include a plurality of modular components which can be used in multiple combinations, even while the components are mounted on a vehicle or when they are selectively and individually removed from the vehicle and used near the area being cleaned. An automatic pump-out system and method are provided for automatically pumping out wastewater and a heating system and method are provided for maintaining the heat of the water being applied to the area being cleaned at a predetermined temperature, even when the operator is not applying the water to the surface.

30 Claims, 21 Drawing Sheets

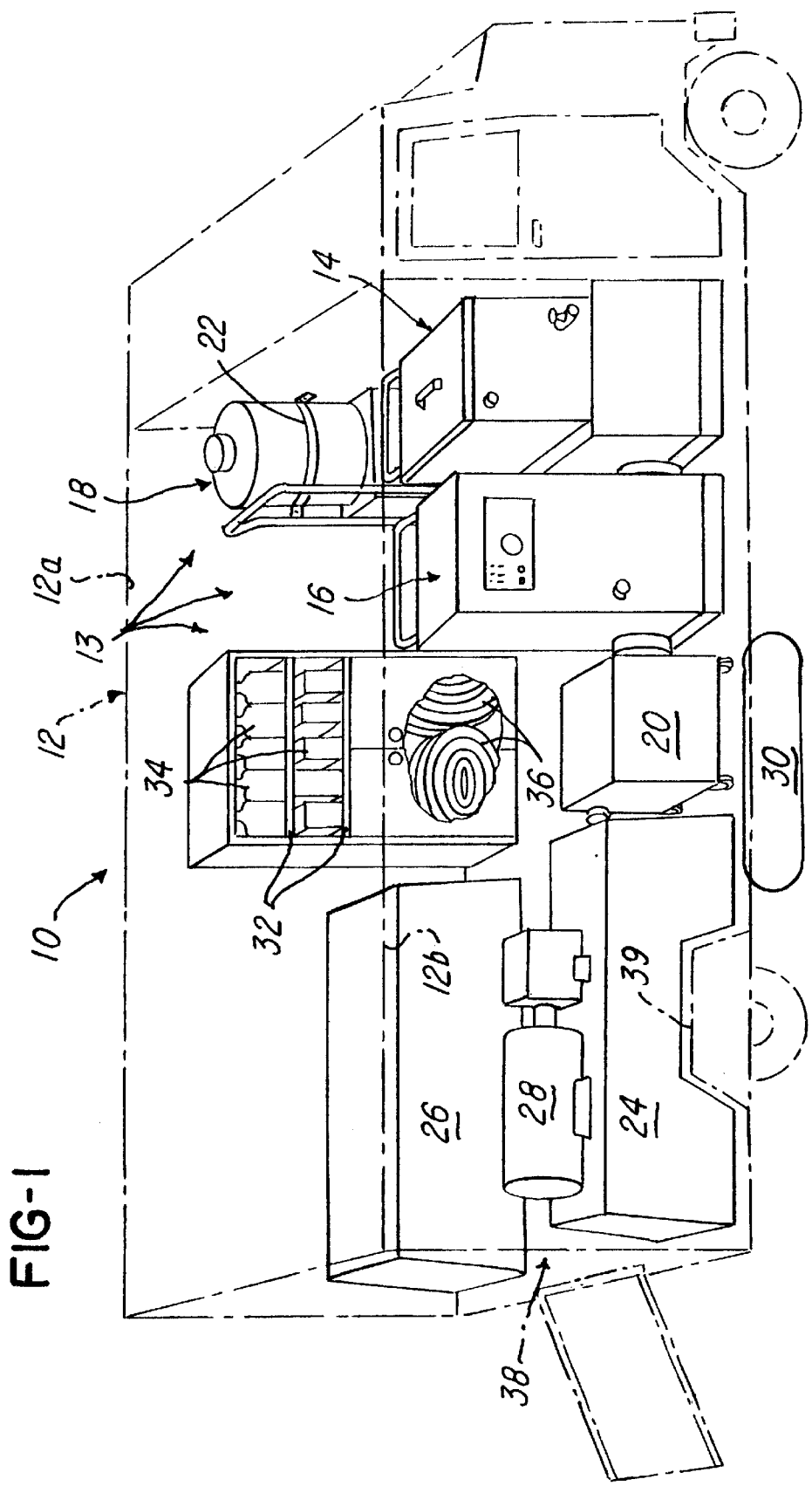

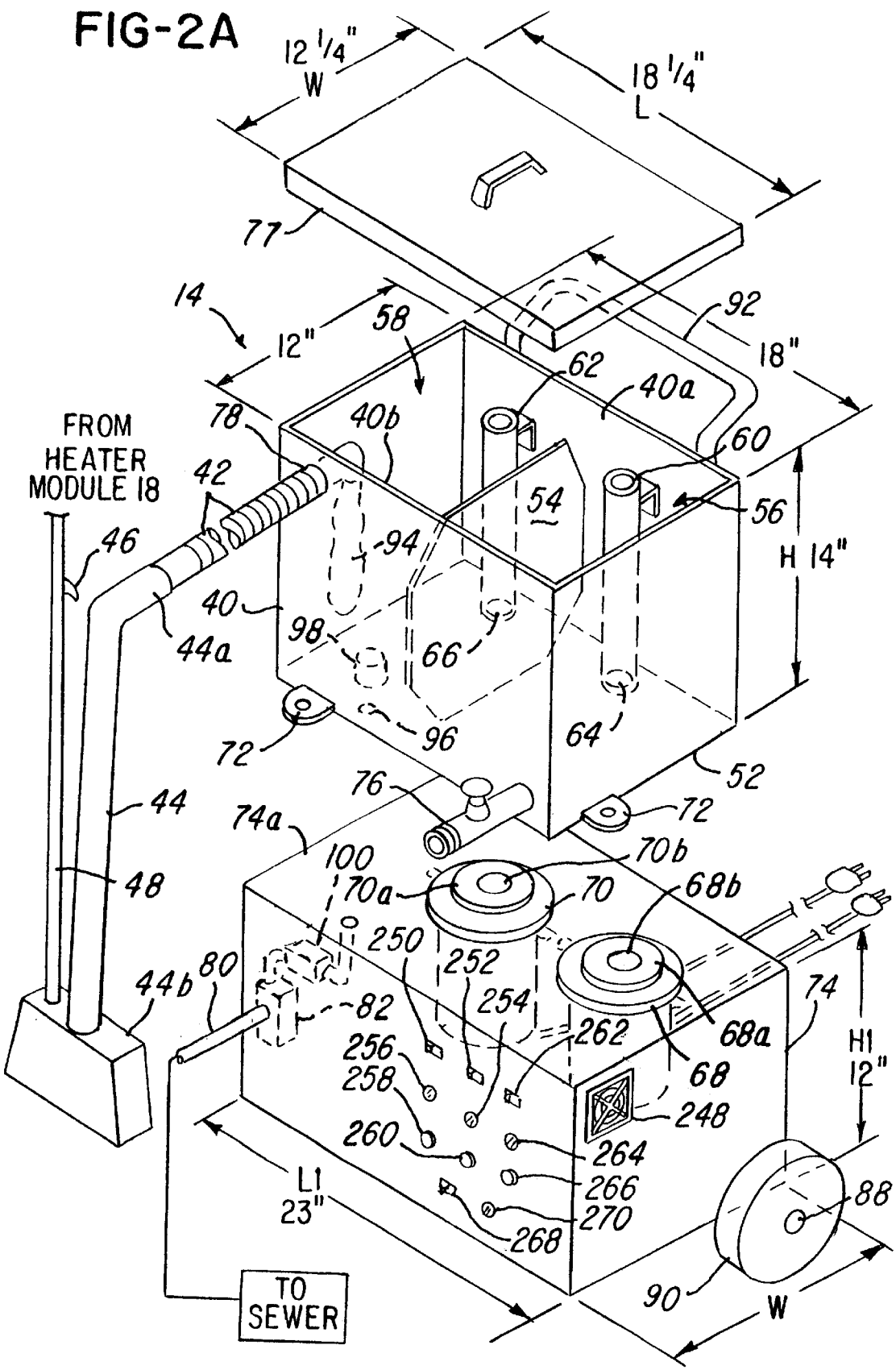

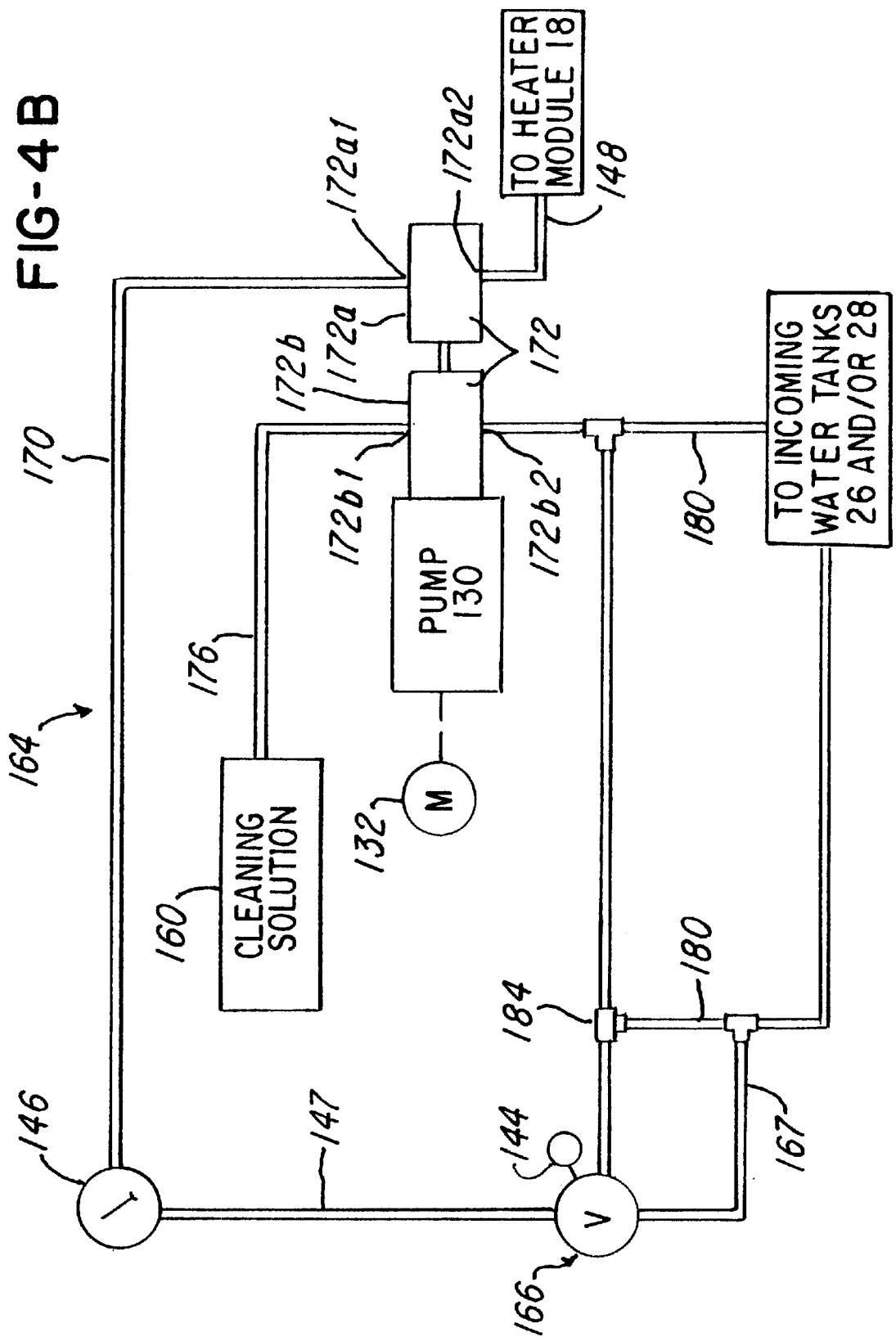

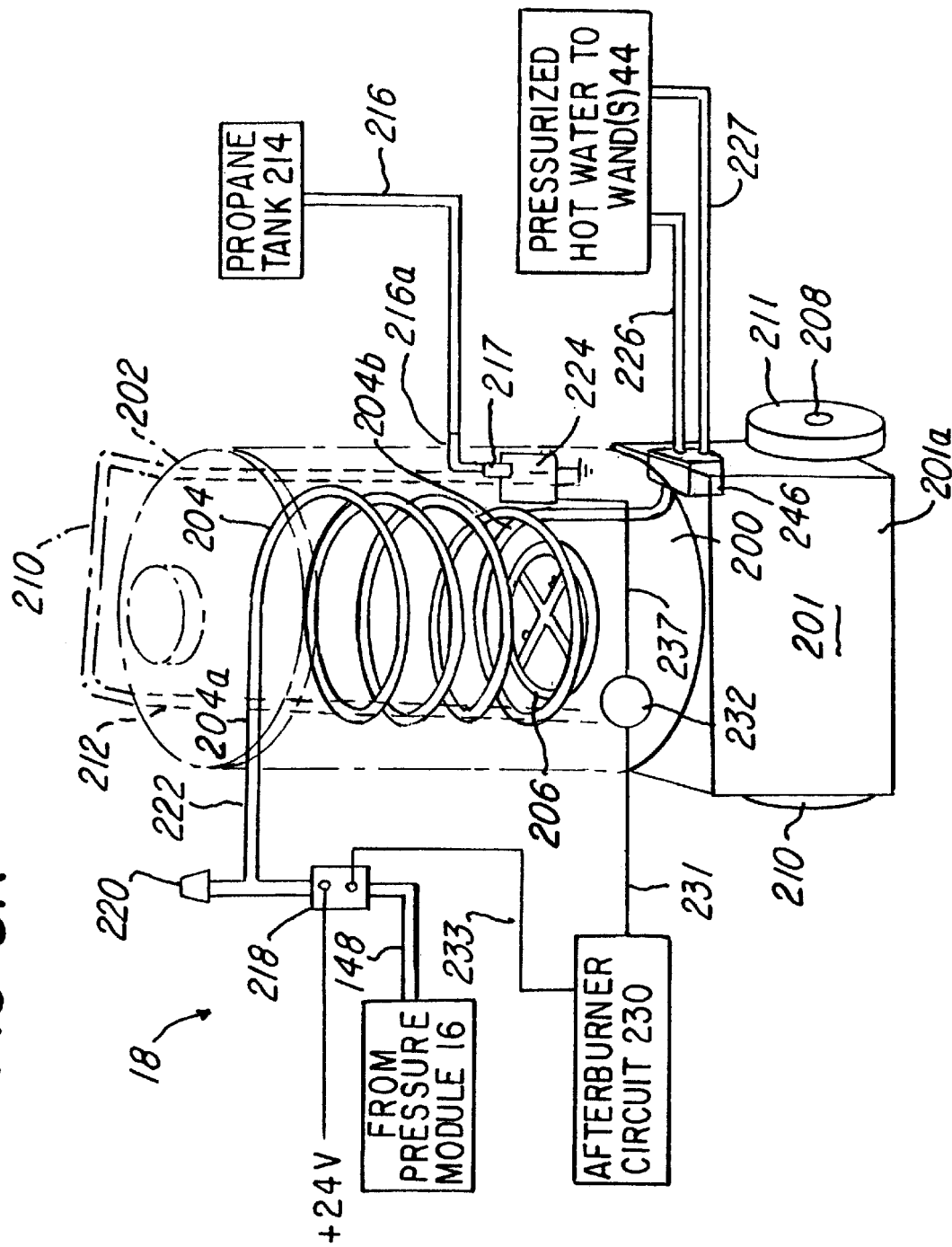

MODULAR VACUUM SYSTEM AND METHOD

BACKGROUND OF THE INVENTION

1. Field of the Invention

This invention relates to a vacuum system and method and, more particularly, to a vacuum system and method comprising a plurality of modular components.

2. Description of the Related Art

Vacuum machines are employed to ingest or "vacuum up" unwanted debris and collect them in a container so that they can be disposed of later.

Dry vacuuming involves the application of vacuum suction by an applicator tool to lift dirt and debris from a surface for transfer through a vacuum hose to a temporary storage container.

Wet vacuuming also involves the use of vacuum pickup, but in a system which has sufficient suction lift capability and watertight construction to lift and transfer liquid and debris, typically to a sewer drain or a temporary storage tank.

Hydro-extraction vacuuming or "steam" cleaning involves the application of a high pressure steam or jet of an aqueous emulsifying solution to a surface and simultaneously or subsequently applying a wet vacuuming operation to pick up and transfer used cleaning solution to a temporary storage tank. State of the art machines mount the cleaning liquid nozzle and the vacuum pick-up head in the same applicator tool to facilitate the hydro-extraction operation. Oftentimes, the vacuum machines have a wand that delivers hot water to a surface to be cleaned, such as carpet. A vacuum tube or hose is also coupled to a head of the wand and collects the wastewater delivered to the surface as an operator cleans the carpet using a back and forth motion.

Pressure washing involves the application of high pressure cleaning solutions or water to a "gun like" applicator tool having a long nozzle and a trigger to activate the high-pressure jet of water for cleaning surfaces or machines of grease and foreign matter.

In the past, cleaning vans had permanent onboard equipment to pressurize, heat and vacuum the water. The equipment was permanently mounted in the vehicle, and had pressure lines and vacuum tubes extending into the building being cleaned.

A collection tank in the vehicle usually housed either a removable, re-usable rigid container for debris or a removable, disposable, replaceable bag for debris. Prior art vacuum devices for heavy-duty industrial use were usually large, heavy and difficult for the operating personnel to move to and from a job site. The devices typically contained all the necessary functions, such as a pressurizer and vacuumer all in one unit. Because the devices had to be portable, the devices could not pressurize the water over 350 pounds per square inch (psi). Also, the vacuum capability of the motors on the portable devices was usually less than 100 cubic feet per minute (cfm).

While the equipment mounted in the vehicles was suitable for cleaning areas that were located less than 250 feet from the vehicle, areas in excess of 250 feet were difficult to clean because of the loss of pressure and vacuum that would occur when the pressure lines and vacuum hoses exceeded this length, such as when cleaning carpeted areas of a multi-story building were being cleaned. This made the use of the vehicles to clean these types of environments difficult. In these situations, portable devices were used, but these did not have the vacuum capability needed.

Another problem with prior art machines is that they did not have the capability to enable multiple wands to be used while maintaining a high-level of pressure and vacuum. Also, the equipment was not portable so that even if a small area had to be cleaned, an operator of the vehicle would have to unload and use an entire length of vacuum hose.

Still another problem with prior art devices is that after the vacuum device had filled to a level with wastewater and debris, the operator would have to cease using the device and manually empty the water. In some prior art systems, a heater was provided to heat the pressurized water. As the operator actuated the trigger on the wand, the heater mechanism would heat the water to the desired temperature. When the operator released the trigger the heater would stop heating the fluid. During the cleaning process, the operator actuated the trigger many times. A problem with prior art devices is that whenever the trigger was released the heating of the fluid to be delivered to the carpet would cease, even if the temperature of the fluid was not heated to the desired temperature, thereby causing cool or warm water to be delivered to the area to be cleaned.

What is needed therefore is a modular system and method whose modules are easy to transport and which can provide a high level of water pressure regardless of the number of wands (e.g., one or two wands) being used, while maintaining the desired temperature of the fluid being delivered to the area being cleaned, regardless of the actuation of the trigger and which at the same time is modular and which can be easily transported from a delivery vehicle to an area to be cleaned.

SUMMARY OF THE INVENTION

It is a primary object of the invention to provide a modular cleaning system having components which are easy to individually transport to an area to be cleaned.

Another object of the invention comprises a cleaning system comprising a plurality of cleaning modules, said plurality of cleaning modules being usable either inside a vehicle or inside a building.

Another object of the invention comprises a portable vacuum system comprising a receiving tank for receiving vacuumed wastewater, said receiving tank comprising at least one wheel for facilitating transporting said receiving tank, at least one vacuum motor for generating a vacuum in said tank and at least one port for coupling said receiving tank to at least one vacuum hose; and said at least one vacuum motor generating a vacuum of at least 60 cubic feet per minute.

Still another object of the invention comprises a method for cleaning comprising the steps of providing a plurality of portable cleaning modules, said plurality of portable cleaning modules being usable either inside a vehicle or inside a building, selecting at least one of said plurality of portable cleaning modules for use in the building, transporting said at least one of said plurality of portable cleaning modules to an area to be cleaned and cleaning said at least one area.

Yet another object of the invention comprises an automatic pump-out system for automatically pumping fluid out of a fluid collection container comprising a pump system, at least one sensor for sensing when the fluid reaches a predetermined level; and a pump-out circuit coupled to said pump system and said at least one sensor for energizing said pump system to pump said fluid out of said fluid collection container when said at least one sensor senses that the fluid has reached said predetermined level.

Still another object of the invention comprises a portable heater system for heating fluid used for cleaning comprising a housing having a heater coil therein for receiving said fluid, a heater for heating said coil, a control valve for controlling heating of said coil; and an afterburner circuit coupled to said control valve and said heater for permitting heating of said fluid when said fluid does not flow through said coil.

Yet another object of the invention comprises a portable pressure system comprising a housing having a pump therein for pressurizing fluid in a pressure line, and a plurality of wheels coupled to said housing for permitting said pressure system to be transported between a vehicle and a cleaning area to be cleaned.

Still another object of the invention comprises a portable vacuum system comprising a receiving tank for receiving vacuumed waste water, said receiving tank comprising at least one wheel for facilitating transporting said receiving tank, at least one vacuum motor for generating a vacuum in said tank, at least one port for coupling said receiving tank to an extractor unit and at least one second port for coupling said receiving tank to a second extractor unit and said at least one vacuum motor generating a vacuum of at least 60 cubic feet per minute.

Another object of the invention is to provide a system and method for enabling multiple operators to clean an area, while maintaining levels of pressure of at least 450 psi and vacuum levels of at least 160 cfm.

Another object of the invention is to provide a system and method which maintains a cleaning fluid temperature at a predetermined temperature, even when an operator is not applying cleaning fluid to the area to be cleaned.

Another object of the invention is to provide a system and method which automatically pumps out the wastewater during a pump-out operation.

Another object of the invention is to provide a system and method which terminates vacuum during the start of the pump-out operation.

Still another object of the invention is to provide a plurality of modules that can be used alone or in combination and which are easily removable from the vehicle that transports them.

Still another object of the invention is to provide a portable vacuum unit which provides at least 160 cfm vacuum capability when the unit is used at an area to be cleaned.

Yet another object of the invention is to provide a system and method for enabling a plurality of operators to be able to clean a plurality of areas while maintaining pressure levels of at least 450 psi and vacuum levels of at least 160 cfm.

These and other objects and advantages of the invention will be apparent from the following description, the accompanying drawings and the appended claims.

BRIEF DESCRIPTION OF THE DRAWINGS

FIG. 1 is a view of a vacuum system comprising a plurality of modules stored in a vehicle;

FIG. 2A is an exploded view of vacuum module in accordance with one embodiment of the invention;

FIG. 4B is a schematic view of a bypass circuit in accordance with one embodiment of the invention;

FIG. 5A is a view of a heater module in accordance with one embodiment of the invention;

DETAILED DESCRIPTION OF THE INVENTION

Figure 2B:
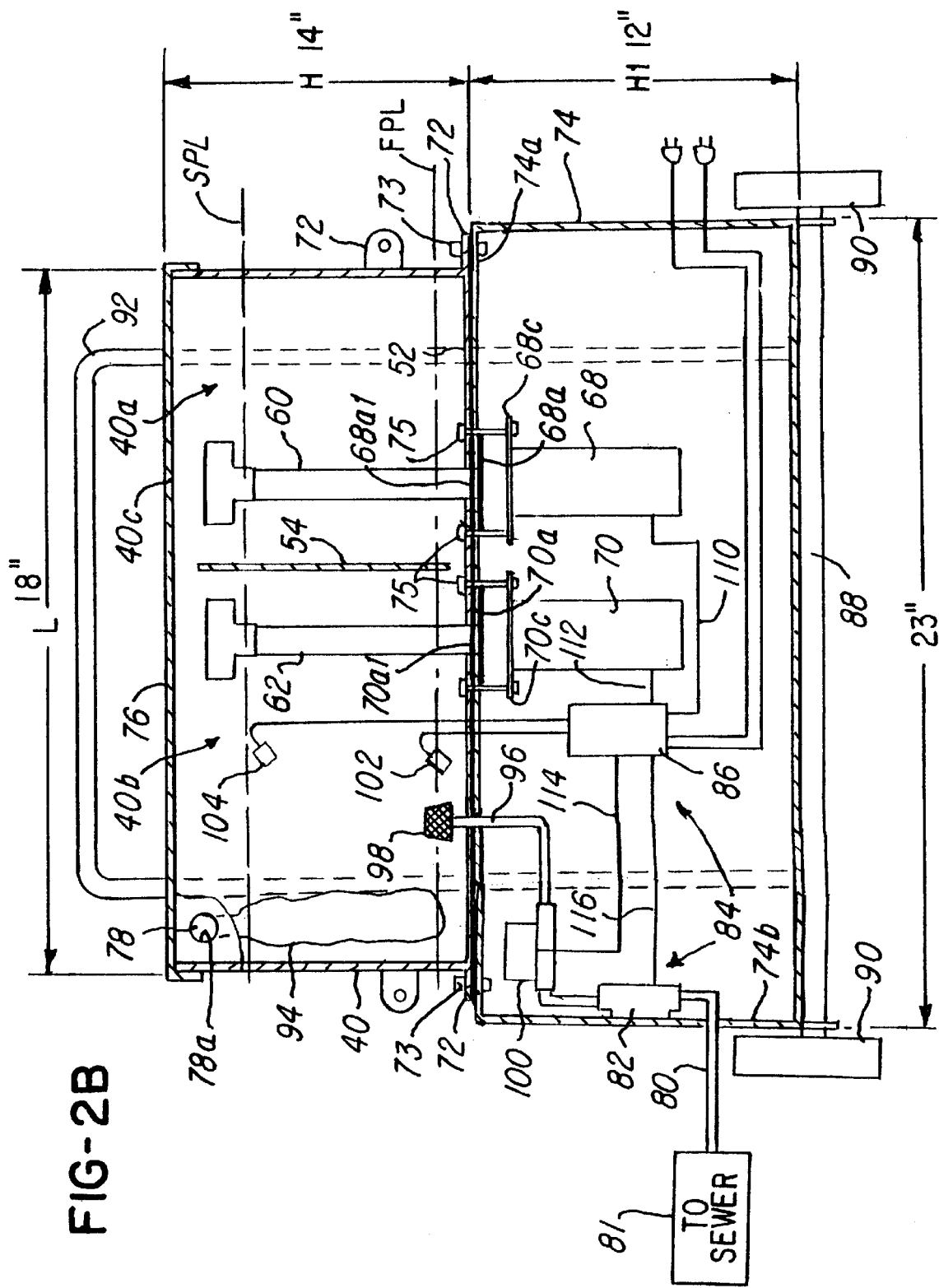
FIG. 2B is a sectional view of the modules shown in FIG. 2A.

Referring now to FIG. 1, a mobile modular vacuum system 10 is shown removably mounted in a vehicle 12, such as a van or mini-van. The system 10 comprises a plurality of modular components 13 comprising a vacuum module 14, a pressure module 16, a heater module 18, and a second vacuum module 20, all of which will be described in detail later herein. The modules 14–20 are portable and may be removably mounted in the vehicle 12 using stainless steel bolts and wing nuts (not shown) mounted on or through the van floor, except for module 20 which is mounted with a strap 22.

In the embodiment being described, the vehicle 12 comprises a plurality of water tanks 24 and 26 which are mounted over the wheel wells 39 to provide a fresh supply of water that may be used during the cleaning process as described later herein. The tanks 24 and 26 are each capable of holding fifty gallons of water. A seven thousand watt electric generator 28 is mounted on tank 24 and provides 110-volt supply power for operating the modules 14–20 either when they are mounted in the vehicle 12 or when they are removed therefrom, up to a distance of 100 feet. Over 100 feet uses electricity available in the building.

A twenty pound removable and portable propane tank 30 is also provided for use with the heater module 18 described later herein. When using the heater module 18 from the vehicle, a propane tank 401*b*, which is belly-mounted to the vehicle, is used. The vehicle 12 further comprises various storage shelves 36 for storing cleaning solutions 34, vacuum supply tubes, wands, tools and the like.

Notice that the modules 14–20 are mounted to and against the walls 12*a* and 12*b* of the vehicle 12 to provide a central passageway 38 approximately two feet wide in the embodiment being described for hauling rolls of rugs, carpet padding, carpet, water-damage equipment and the like.

As illustrated in FIG. 1, the modules 14–20 are mounted against the walls 12*a* and 12*b* as shown and they may be operatively coupled together and to tanks 24 and 26 and energized by generator 28 to provide on-board cleaning and extraction while the modules remain in the vehicle 12.

The various individual modules 14–20 will now be described relative to FIGS. 2–7. As shown in the exploded view in FIG. 2A, the main vacuum module or extractor 14 comprises a wastewater receiving tank 40 coupled to a vacuum tube 42 which is secured to an end 44*a* of a wand 44. The wand 44 has a trigger 46 at the end 44*a*, and a wand head 44*b* for delivering cleaning solution to an area to be cleaned and also for extracting wastewater from the area. In this regard, the head 44*b* receives pressurized hot water supply from pressure line 48 from the heater module 18. The wand 46 is of conventional design and receives the heated water from the module 18 under about 450 psi pressure while the vacuum extractor module 14 simultaneously provides approximately 220 cfm vacuum. In the embodiment being described, the line 48 is a one-quarter inch inner diameter solution line.

As best illustrated in FIG. 2A, the vacuum extractor module 14 comprises the receiving tank 40 for receiving the vacuumed wastewater from the tube 42. In the embodiment being described, the tank 40 can hold approximately 18 gallons of wastewater generated during the cleaning operation. Notice in FIG. 2B that the tank 40 is generally rectangular and comprises a floor 52 and baffle wall 54 secured between walls 40*a* and 40*b* of tank 40 by, for example, a spot-weld. The baffle wall 54 provides support strength to tank 40. In FIG. 2-A, the baffle wall 54 separates the tank 40 into areas 56 and 58. A first tube 60 and second tube 62 are coupled through apertures 64 and 66 to the floor 52 to a first three-stage switch reluctance vacuum motor 68 and a second three-stage switch reluctance vacuum motor 70 (FIG. 2B), respectively.

As illustrated in FIG. 2A, the front panel of motor housing 74 comprises various components. An axial fan 248 cools motor housing 74 when switch 250 supplies power to vacuum motor 70. A light 256 is powered by the circuit controlling motor 70 to indicate that the motor 70 is on. A conventional fuse 258 protects the motor 70 and remains on while vacuum motor 70 is on. A switch 252 controls the supply of power to vacuum motor 68 and light 254 indicates motor 68 is on. The motor 68 is also protected by a fuse 260. A switch 262 supplies power to the EPO circuit 86 (shown in FIG. 2B) activating the EPO circuit 86 when a predetermined level is reached in the tanks. A light 264 indicates that the EPO circuit 86 is ready and a fuse 266 protects the circuit. A light 270 indicates the pump-out pump 82 is in a ready state and a switch 268 interrupts power to the pump-out pump 82 if the pump-out pump 82 fails during a cleaning operation. Switch 268 allows EPO circuit 86 to operate during a pump-out pump 82 failure, thus allowing motors 68 and 70 to continue operating if desired, in which case the manual drain 76 is used to drain tank 40.

A plurality of mating mounting tabs 72 are provided for mounting the tank 40 to the motor housing 74 (FIG. 2B) and/or to a modular wheeled machine frame defined by the tubular handle 92. In the embodiment being described, the motors 68 and 70 are mounted to a surface 74*a* of motor housing 74 using stainless bolts and gaskets 68*a* and 70*a* to seal the motors 68 and 70 against the surface 74*a*. Another set of gaskets 68*a*1 and 70*a*1 are situated between motor housing 74 and tank 40. Once sealed, the vacuum areas 68*b* and 70*b* communicate with the tubes 60 and 62, respectively, to provide a vacuum from areas 56 and 58 after lid 77 is mounted on tank 40.

The tank 40 comprises a manual drain valve 76 for manually draining wastewater and a vacuum hose hookup coupling 78 for coupling the end 44*a* of hose 44 to the tank 40. In the embodiment being described, the vacuum module 14 also comprises an automatic drain system 84 (FIG. 2B) for automatically draining the wastewater from the tank 40 through line 80 that is coupled to a pump-out pump 82. The line 80 guides the wastewater to a suitable waste outlet or sewer 81. The operation of the automatic drain system 84 will be described later herein.

As best illustrated in the cross-sectional view in FIG. 2B, the module 14 further comprises the motor housing 74 having the motors 68 and 70 mounted to the top 74*a* of the housing 74 with the bolts 75 which go into flanges and secured with stainless steel lock nuts 68*c* and 70*c* as shown. The motors 68 and 70 are coupled to an electronic pump-out control circuit 86. The control circuit 86 is coupled to the pump-out pump 82 that is mounted to an interior wall 74*b* of housing 74. As described later, the pump-out pump 82 is periodically energized by the control circuit 86 to pump wastewater from the tank 40 when it reaches a predetermined level. The electronic pump-out ("EPO") circuit 86 automatically shuts off the vacuum motors 68 and 70 during the pump-out operation, which facilitates reducing or eliminating the need for the operator to manually empty the tank 40.

As shown in FIG. 2B, a nylon filter bag 94 is mounted over an end 78*a* of the inlet port 78 to collect large debris. The pump-out pump 82 is coupled to a solenoid valve 100, an outlet line 80 and a drain 96 on the floor 52 of tank 40. The pump 82 pumps the wastewater out of tank 40 at a rate of about 6 gallons per minute. In the embodiment being described, the drain 96 may have a secondary strainer 98 for preventing debris from entering the pump-out pump 82.

Solenoid valve 100 is a 24-volt solenoid and is coupled between drain 96 and pump-out pump 82 and cooperates with pump-out pump 82 in response to the EPO circuit 86 to drain the tank 40 of waste water in accordance with the control logic described later herein. The EPO circuit 86 (FIG. 3) comprises a first sensor or floating switch 102 and second sensor or floating switch 104 which cooperate to maintain the wastewater at a predetermined level, such as four inches below the top edge 40*c* of tank 40. The EPO circuit 86 is coupled to the sensors 102 and 104 via conductors 106 and 108, respectively. The input voltage to the EPO circuit 86 is a conventional 110-volt, 15 amp current AC power supply. The EPO circuit 86 is also coupled to motors 68 and 70 via lines 110 and 112, respectively. Notice that solenoid 100 and pump 82 are coupled to the EPO circuit 86 via lines 114 and 116, respectively.

In the embodiment being described, the tank 40 (FIG. 2A) comprises a width W of 12 inches, a length L of 18 inches and a height H of 14 inches. Notice that the length $L_2$, height $H_2$ and width $W_2$ of motor housing 74 in FIG. 2A are 21 inches, 14 inches and 12 inches, respectively. As mentioned earlier, tank 40 is mounted directly on top of the motor housing 74 such that the hollow tubes 60 and 62 communicate with openings 68b and 70b of motors 68 and 70, respectively, and the gaskets 68a and 70a seal against the floor 52.

The plurality of flanges 72 are provided to secure the tank 40 on top of the motor housing 74 with nuts and bolts 73 (FIG. 2B) or to the modular wheeled machine frame.

A feature of the invention is that the modules 14–20 are easy to remove and are individually transportable by a single operator. Notice that the bottom of the housing 74 comprises an axel 88 for receiving a pair of ten-inch pneumatic tires 90 so that the motor housing 74 and tank 40 may be moved and transported from the vehicle 12 (FIG. 1) to the building or structure, and to the area to be cleaned. The module 14 also comprises a handrail 92 that facilitates tilting and moving the module 14 as desired. Details of the EPO circuit 86 will now be described in relation to FIG. 3.

Figure 3:
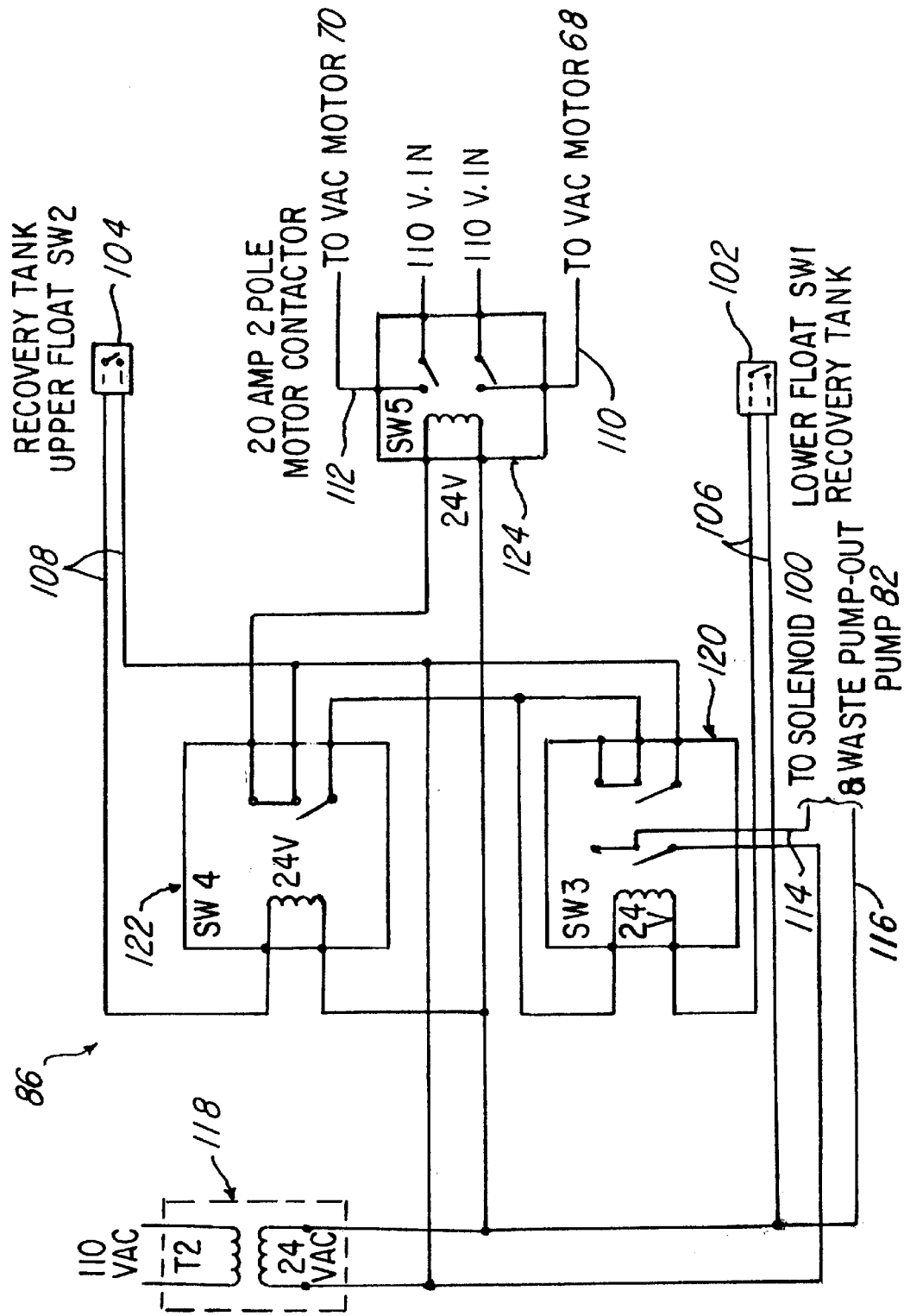
FIG. 3 is a schematic diagram of an electric pump-out circuit in accordance with one embodiment of the invention.
Figure 4A:
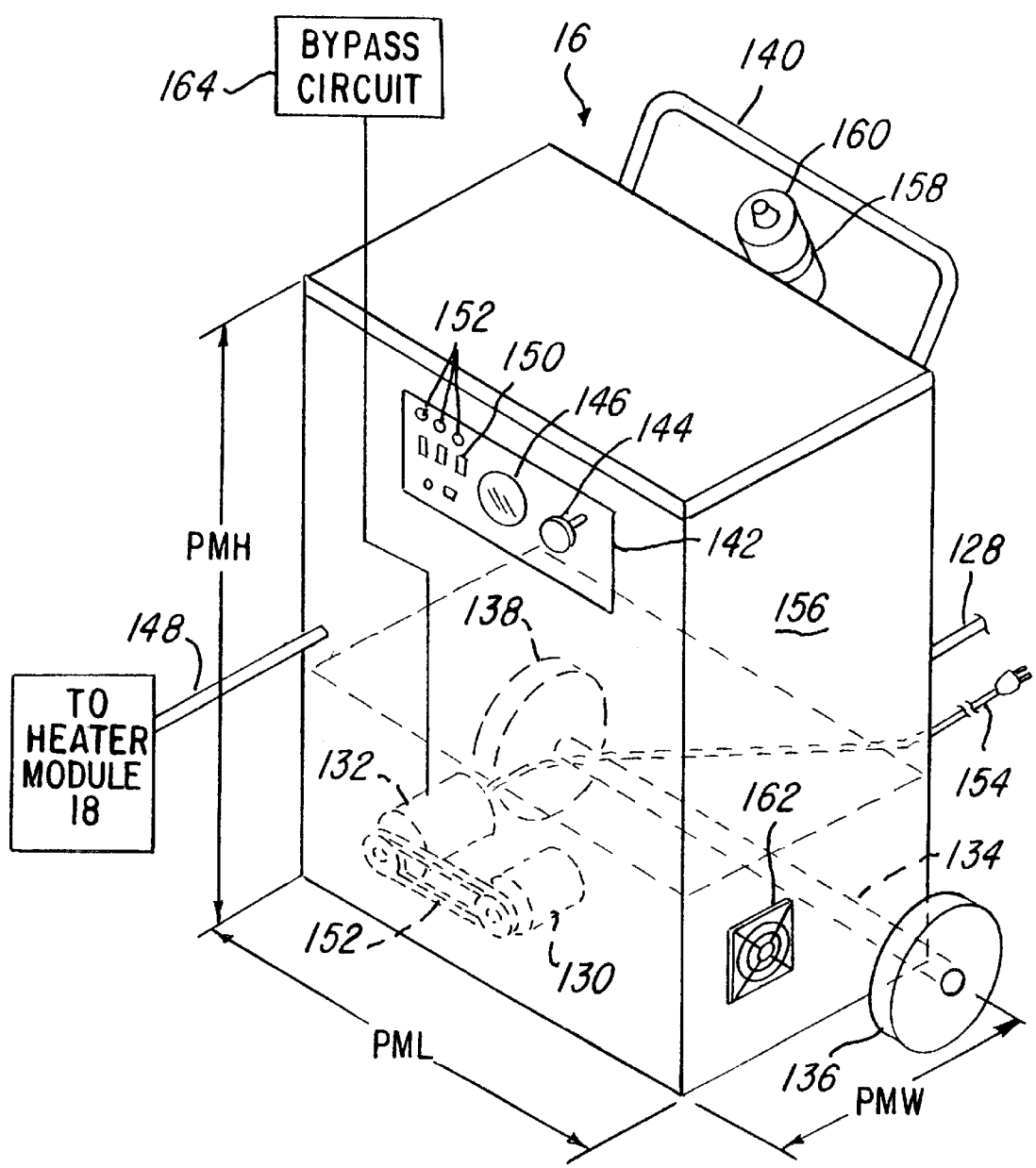
FIG. 4A is a perspective view of a pressure module in accordance with one embodiment of the invention.

As illustrated in FIG. 3, the EPO circuit 86 comprises a first transformer 118 that transforms the 110-volt AC input to 24-volt AC. The switches 102 and 104 are normally open. The switches 102 and 104 are coupled, as shown, to a third switch or relay 120 and a fourth switch or relay 122 as shown. During normal operation, the tank 40 is usually empty as it begins filling with vacuumed wastewater. During this normal operation, the third and fourth switches 120 and 122 close as the wastewater exceeds first and second predetermined levels, respectively. When open, the switches 120 and 122 permit power to be supplied to the first and second motors 68 and 70. Notice, however, that because the switches 102, 104, 120 and 122 are open, no power is provided to energize either the solenoid 100 or the pump-out pump 82 initially.

A pump-out mode of operation will now be described during which the EPO circuit 82 terminates power to the motors 68 and 70 while simultaneously energizing solenoid 100 and pump-out pump 82 to pump wastewater out of the tank 40. During this mode, as the wastewater level rises above a first predetermined level (FPL in FIG. 2B) measured by the first switch 102, the first switch 102 closes. When wastewater rises to the second predetermined level (SPL), the second switch 104, third switch 120 and fourth switch 122 close. The fifth switch 124 opens in response thereto, which interrupts the power to the first and second vacuum motors 68 and 70. Notice that the closing of the third switch 120 causes the solenoid 100 and water pump-out pump 82 to become energized while the motors 68 and 70 are off. The energized solenoid valve 100 opens to permit the waste pump-out pump 82 to pump wastewater from the tank 40 through the drain 96.

Advantageously, this system and method terminates power to one or more of the vacuum motors 68 and 70 while simultaneously energizing the pump-out pump 82 and solenoid 100 so that the wastewater is pumped out of the tank 40. This enables the pump-out pump 82 to avoid working against the vacuum created by the vacuum motors 68 and 70 as it pumps the wastewater from the tank 40. This facilitates emptying the tank 40 in less than about 15 seconds, depending largely upon the first and second predetermined levels established for the first and second sensors 102 and 104, respectively, and the pumping capacity of the pump 82.

When the wastewater is pumped out and falls just below the sensor 104, such as seven inches below the top edge 40c (FIG. 2B) of the tank 40, the first switch 102 remains closed while the second switch 104 opens. When the second switch 104 opens, the third switch 120 remains closed and fourth switch 122 opens in response. When the water level reaches below a first predetermined level (FPL), switch 102 opens, thereby terminating power to the solenoid 100 and pump-out pump 82. Notice also that switch 124 closes to provide power to the vacuum motors 68 and 70 so that the user can resume the vacuum or extraction process when switch 104 opens. The operation of various mode of operation of the EPO circuit 86 in FIG. 3 is summarized in the following Table 1:

TABLE 1

| EVENT | Sw1 102 | Sw2 104 | Sw3 120 | Sw4 122 | Sw5 124 | Main Vacs | Solenoid | Pump-out pump |
|---|---|---|---|---|---|---|---|---|
| A | OPEN | OPEN | OPEN | OPEN | CLOSED | ON | OFF | OFF |
| B | CLOSED | OPEN | OPEN | OPEN | CLOSED | ON | OFF | OFF |
| C | CLOSED | OPEN | OPEN | OPEN | CLOSED | ON | OFF | OFF |
| D | CLOSED | CLOSED | CLOSED | CLOSED | OPEN | OFF | ON | ON |
| E | CLOSED | OPEN | CLOSED | OPEN | CLOSED | ON | ON | ON |
| F | OPEN | OPEN | OPEN | OPEN | CLOSED | ON | OFF | OFF |

A - Tank 40 is empty or below second predetermined level, water level below first predetermined level for switch 102.
B - Wastewater level in tank 40 is above first predetermined level for switch 102, but below second predetermined level for switch 104.
C - Wastewater in tank 40 is almost full, still approaching second predetermined level.
D - Wastewater level in tank 40 is above first and second predetermined levels.
E - Wastewater level in tank 40 is fully back below second predetermined level, but remaining above first predetermined level.
F - Wastewater level in tank 40 is below second predetermined level, but remaining above first predetermined level.

Advantageously, the EPO circuit 86 reduces the active vacuum inside the tank 40 by shutting down the vacuum motors 68 and 70 when the float switches 102 and 104 are closed while the pump-out pump 82 is energized, thereby closing the switch relays 120 and 122 causing the solenoid valve 100 and wastewater pump 82 to become energized.

The system 10 also comprises the pressure module 16 (FIG. 4A), which provides a pressurized mixture of cleaning solution and water. The pressure module 16 receives fresh water in through line 128. The water may be supplied by the tanks 24 and 26 (FIG. 1) in the vehicle 12 or from an independent source such as a faucet or spigot, such as the spigot 500 illustrated in FIG. 15. The pressure module 16 comprises a pressure pump 130 which receives the incoming water. In the embodiment being described, the pump 130 is a high-pressure 1200 psi four gallon per minute pump driven by an energy-efficient capacitor start electric motor 132.

Two ten-inch pneumatic tires 136 and 138 are rotatably mounted on an axle 134 that is mounted on module 16. The module 16 also comprises a handle 140 mounted on a housing 156 by conventional means, such as a bolt, weld or other fastener so that, like the vacuum module 14, it can be moved and transported like a two-wheeled dolly (not shown).

A control panel 142 comprises a pressure relief valve control 144 that is adjustable between 0–1200 pounds per square inch. The panel 142 further comprises a pressure gauge 146 for monitoring the pressure of the water exiting the pressure module 16 through the pressure line 148. In the embodiment being described, the panel 142 further comprises switches 150 that control various panel lights 152 for illuminating the panel 142.

The motor 132 is coupled to an AC outlet via the electrical connection connector 154. The motor 132 rotatably drives, by a belt 152 (FIG. 4A), the pressure pump 130. The electric motor 132 is a one and one-half horsepower amperage capacitor start electric motor. Notice that the module 16 comprises the housing 156 having a belt strap 158 or other suitable means for securing a supply container 160, such as a plastic two and one-half gallon bottle, of cleaning solution (not shown) that will be mixed with and metered into the pressurized line 148. It should be appreciated that the pump 130 pressurizes the fluid so that it exits through line 148 to heater module 18 at up to approximately 1220 pounds per square inch (psi) at a rate of approximately four gallons per minute (GPM).

In the embodiment being described, the module 16 comprises a pressure module width (PMW) of about 21 inches, a pressure module length (PML) of about 23 inches, and a pressure module (PMH) height of about 40 inches. A fan 162 may be provided to cool the motor 132 and pump 130. The module 16 comprises a by-pass loop 164 (FIG. 4A) that will now be described in reference to FIG. 4B.

The bypass loop circuit 164 (FIG. 4B) bypasses water flow within the loop in the event the operator is not applying pressurized fluid to the surface to be cleaned. The by-pass circuit 164 comprises a pressure gauge 146 which is mounted in the panel 142 shown in FIG. 4A. The pressure gauge 146 is coupled, via pressure line 147 to a back-pressure relief valve 166 that is coupled to an incoming water supply, such as the incoming water tanks 24 and 26 (FIG. 1) or other suitable water supply such as a faucet or spigot (not shown). The pressure gauge 146 is also coupled, via pressure line 170, to a first port 172a1 of a high-pressure side 172a of the solution-metering valve 172 as shown. A second port 172a2 of the high-pressure side 172a of solution metering valve 172 is coupled to the heater module 18 as shown, via pressure line 148.

A first port 172b1 of low-pressure side 172b of the valve 172 is coupled, via solution line 176, to the cleaning solution 160. The port 172b2 of low-pressure side 172b of the valve 172 is coupled to the incoming water supply as shown.

A thermal relief valve 184 having a maximum thermal relief temperature of about 140 degrees Fahrenheit is mounted between a backpressure relief valve 166 and the port 172b2 of low-pressure side of the valve 172. The backpressure relief valve 166 has the valve control 144 located on the panel 142 (FIG. 4A) of pressure module 18.

During normal operation, incoming water flows through the low-pressure side 172b (FIG. 4B) of valve 172 and mixes with chemical cleaning solution 160, which enters the valve 172 via line 176. The electric motor 132 drives pump 130 to pressurize the mixture of water and chemical solution up to about 1200 pounds per square inch and delivers the mixture at a rate of about four gallons per minute. The fluid mixture is delivered to the heater module 18 via the high-pressure line 148, which in the embodiment being described has a three-eighths inch inner diameter.

As the incoming water from line 180 is pressurized by pump 130 the chemical solution 160 is drawn by vacuum through line 176 as an operator actuates trigger 46 (FIG. 2A) on wand 44. Although not shown, the pressure module 16 may comprise a Dwyer meter (available from Windtrax, Inc., Shawnee Mission, Kans.) for metering in cleaning solution 160. When the operator releases the trigger 46, the bypass circuit 164 causes the pressurized water to flow through pressure gauge 146, backpressure relief valve 166, which is adjusted by the operator using control 144 as desired, and the thermal relief valve 184, which allows a maximum temperature in the embodiment being described of 140 degrees Fahrenheit. As temperature in the bypass loop 164 increases to a point exceeding the predetermined temperature determined by the thermal relief valve 184, which is set at 140 degrees Fahrenheit in the embodiment being described opens to line 167 to dump flow to line 180 in order to accommodate and relieve any excess temperature in the bypass loop 164. Motor 132 stays on when valve 184 opens and dumps the over 140-degree water, new cold water is drawn from tanks for the loop.

The pressure module 16 may optionally include a stainless steel float tank (not shown) as a fresh water reservoir for use when the pressure module 16 is used out of vehicle 12.

As illustrated in FIG. 4B, the pressure module 16 comprises the high-pressure line 148 which is coupled to the heater module 18 which will now be described relative to FIGS. 5A–5B. The heater module 18 comprises a cylindrical housing 200 and a lid 202. The housing comprises a heater coil 204 through which pressurized water from line 148 is received from the pressure module 16. The pressurized fluid travels through the coil 204 and a propane burner ring 206 heats the coil 204 and fluid therein. The heater module 18 comprises an axle 208 on which two ten-inch pneumatic tires 211 are mounted. A handrail 210 comprises elongated sections 212 secured to the housing 200. The burner ring 206 is coupled to a propane tank 214 that stores liquid propane fuel. The tank 214 may be portable or it may be a larger 40-pound capacity belly mounted tank 215 (FIG. 1) situated underneath the vehicle 12.

Referring to FIG. 5A, pressurized cold water enters via line 148 from pressure module 16 through a normally open 24-volt flow switch 218. Module 18 has its own 110-volt to 24-volt transformer (not shown) located in the bottom of unit 201 under the coil 204. Module 18 plugs into Module 16 for 110-volt AC. Pressure relief valve 220 will open when system pressure exceeds a certain pre-determined level for safety reasons. The pressurized mixture of water and chemical solution from the pressure module 16 enters an input port 222 into a first end 204a of heater coil 204. The fluid passes through coil 204 and is heated by ring 206. The control valve 224 is coupled via line 216 to the propane supply tank 214 and controls the flow of propane through the burner ring 206. The valve 224 also controls automatic ignition of the ring 206.

The flow switch 218 and pressure gas valve 224 are electrically coupled to an after burner circuit 230 by lines 233 and 231, respectively. A thermostat switch 232 (FIG. 5A) is located on a base 201 a of housing 201. The thermostat switch 232 enables an operator to control the temperature of the fluid. In the embodiment being described, the ring 206 can deliver approximately 240,000 British Thermal Units (BTUs) to the coil 204 and, consequently, can heat the water to between 60–270 degrees Fahrenheit. The thermostat switch 232 is coupled to the propane gas valve 224 mentioned earlier. It should be understood that the valve 224 has a pilotless auto ignition spark generator for igniting the propane gas at start-up or when the trigger 46 (FIG. 2A) is actuated by the operator.

Figure 5B:
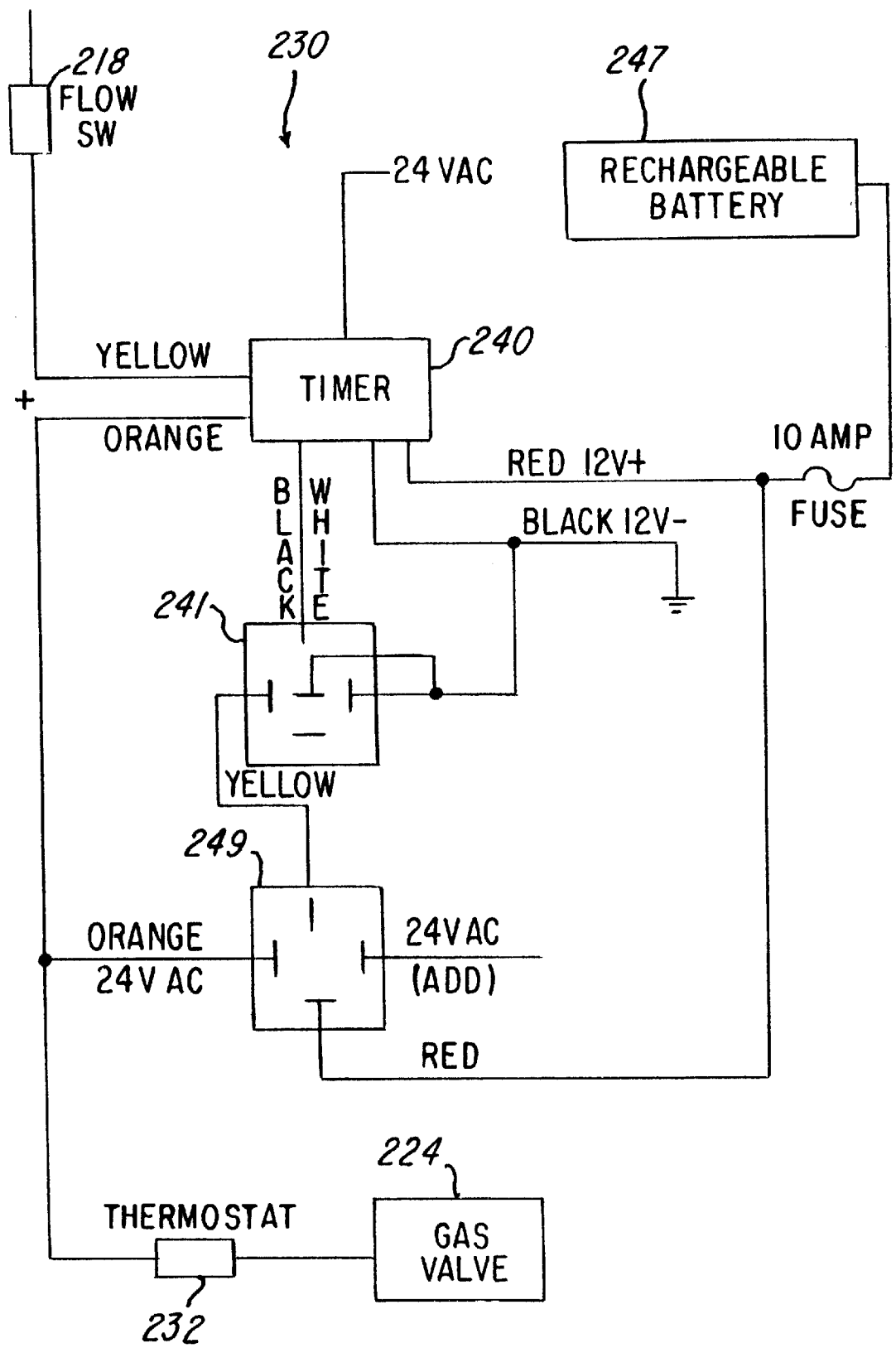
FIG. 5B is a schematic diagram of an after burner circuit used in the heater module shown in FIG. 5A.

As illustrated in FIG. 5A, when the module 18 is used outside of the vehicle 12, the supply of propane gas is supplied by a portable propane tank 214 by coupling the conventional propane female connector coupling 217 on tank 214 to line 216 which has a mating male connector 216a. During truck mount operation, the propane is provided by the belly-mounted propane tank 30 (FIG. 1) mounted under the vehicle 12. The lines 231 (FIG. 5A) and 233 are coupled to an after burner circuit 230 for maintaining fluid at a desired temperature, even when the operator is not actuating trigger 46. The circuit 230 will now be described relative to FIG. 5B.

The circuit 230 is coupled between the flow switch 218 and thermostat switch 232 as shown. The energizing current from a 24-volt source is received by the after burner circuit 230 from the flow switch 218, into the thermostat control 232 and finally into the propane gas valve 224. In addition, an external 12-volt DC source (not shown) is received by switch 240 and switch 242 only as operating current for their coils. Another relay switch 249, which is 24-volt AC coil that controls the 12-volt DC current going to the coils of switch 240 and 241. As the current flows from switch 218 through switch 240 to switch 232, circuit 230 is normally open and not functioning. As soon as the wand trigger 46 is released, the flow switch 218 is open. This causes switch 249 to close which sends 12-volt DC into switch 241 and switch 240 which allows the 24-volt AC that was interrupted when switch 218 opened to continue to complete the circuit all the way to switch 232, depending on how long the timer in switch 240 is set. In this example, the timers can be set between 0 and 60. This allows current to pass through switch 232, as long as the set temperature on switch 232 has not been exceeded, to gas valve 224 in module 18 so the burner ring 206 (FIG. 5A) continues to supply propane to the burner coil 204. When the wand trigger 46 is again depressed, flow switch 218 completes the circuit and circuit 230 is turned off. Thus, it should be appreciated that the only time circuit 230 is activated is immediately after switch 218 is open. Circuit 230 will complete the flow of power to valve 224 if the temperature set in thermostat switch 232 has not been exceeded, and according to the time limit set in the timing relay switch 240. When the pressurized water is received by the heating module 18 and heated through coil 204, the flow switch 218 allows the current to go through the after burner circuit 230.

In the embodiment being described, the after burner circuit 230 comprises an adjustable timer switch 240 located on the base 201a (FIG. 5A), which permits the operator to adjust the maximum time the after burner circuit 230 permits the valve 224 to remain open so propane fuel supply to coil 204 continues. In this embodiment, the switch 240 is a 12-volt DC timed relay switch available from Directed Electronics, Inc. and can be adjusted to between 0–60 seconds. The switch 240 is coupled to a relay 241 that is coupled to another switch 249.

During the cleaning process, the operator actuates the trigger 46 (FIG. 2A), which opens a trigger valve (not shown) on the wand 46 to permit the pressurized fluid to flow through the head 44b (FIG. 2A) of wand 44 to clean the surface. The actuation of the trigger 46 on wand 44 causes the fluid flow which valve 224 senses and responds by igniting the propane fuel which is exiting the ring 206 in order to heat the coil 204 of pressurized fluid. When the operator releases the wand trigger 46, the flow switch 218 senses no fluid flow and energizes the valve 224 to shut down the gas being delivered to the ring 206 in response thereto, but after circuit 230 has operated. During a typical operation, the operator will actuate the wand trigger 46 many times.

When the fluid temperature has not achieved a desired temperature, as set by the operator on the thermostat 232, the after burner circuit 230 will override the flow switch 218 and permit the propane gas valve 224 to continue supplying propane fuel to the burner ring 206. In the embodiment being described, the override will occur as long as the fluid temperature is below a predetermined temperature, such as wherever the thermostat control has been set 0–302 degrees Fahrenheit. In this regard, the burner circuit 230 will override the flow switch 218 and continue to send voltage through the thermostat 232 which controls the valve 224 to continue to deliver propane to the burner ring 206, enabling it to burn even though the wand trigger 46 is in the off position.

Advantageously, this feature of the invention eliminates the valve 224 from cycling on and off every time the wand trigger 46 is actuated between the on and off positions by the operator. The burner ring 206 is permitted to continue to operate until the desired fluid temperature is reached. If the desired fluid temperature is reached and the operator has triggered the wand trigger 46 to the off position, then the switch relay 249 will shunt the current from switch 218 to flow directly to valve 224 so that the valve 224 terminates fuel supply. In this case, the switch relay 249 bypasses the after burner circuit 230, thereby preventing the heater module 18 from overheating the fluid as it passes through the coil 204 in module 18.

Advantageously, the after burner circuit 230 provides accurate heat control and even heating of coil 204 and the fluid therein, especially when the operator is not actuating trigger 46, but the water is not at the desired temperature.

Figure 6A:
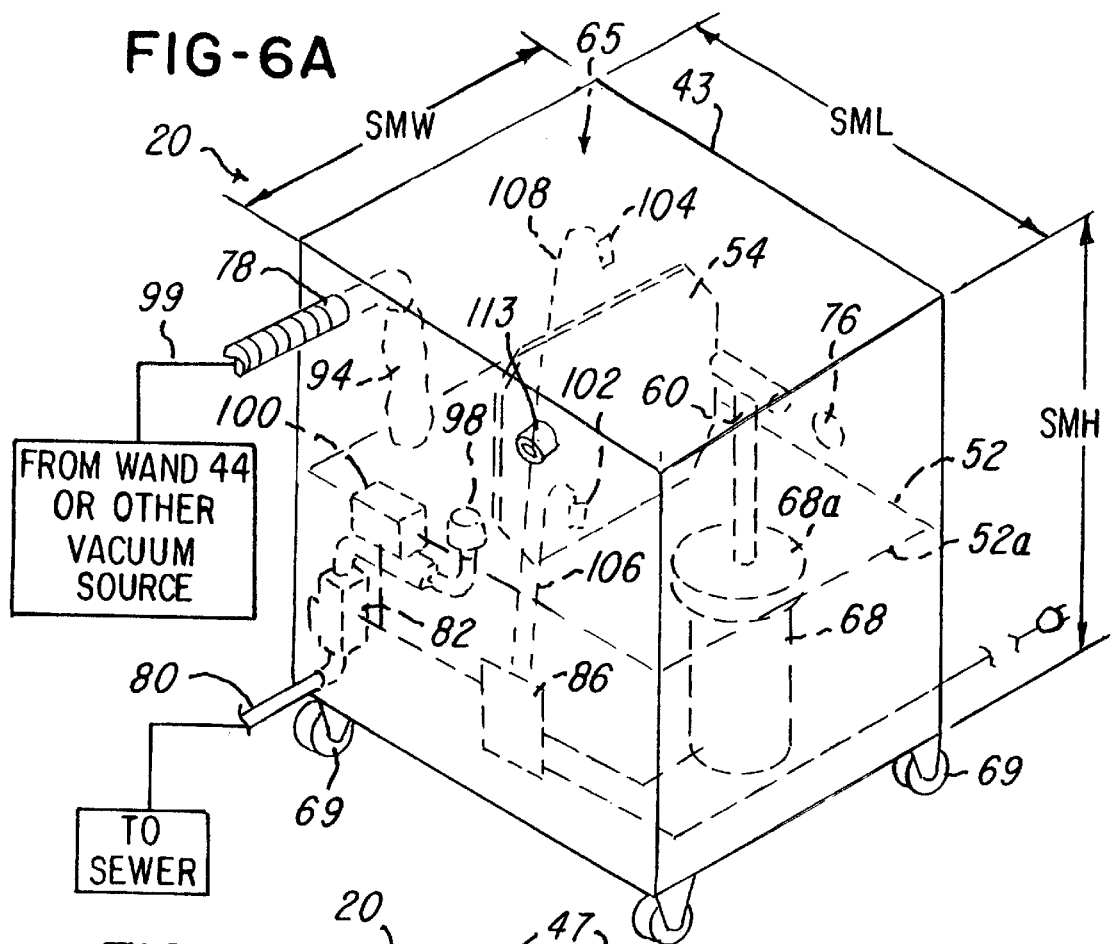
FIG. 6A is a view of another vacuum module in accordance with one embodiment of the invention.
Figure 6B:
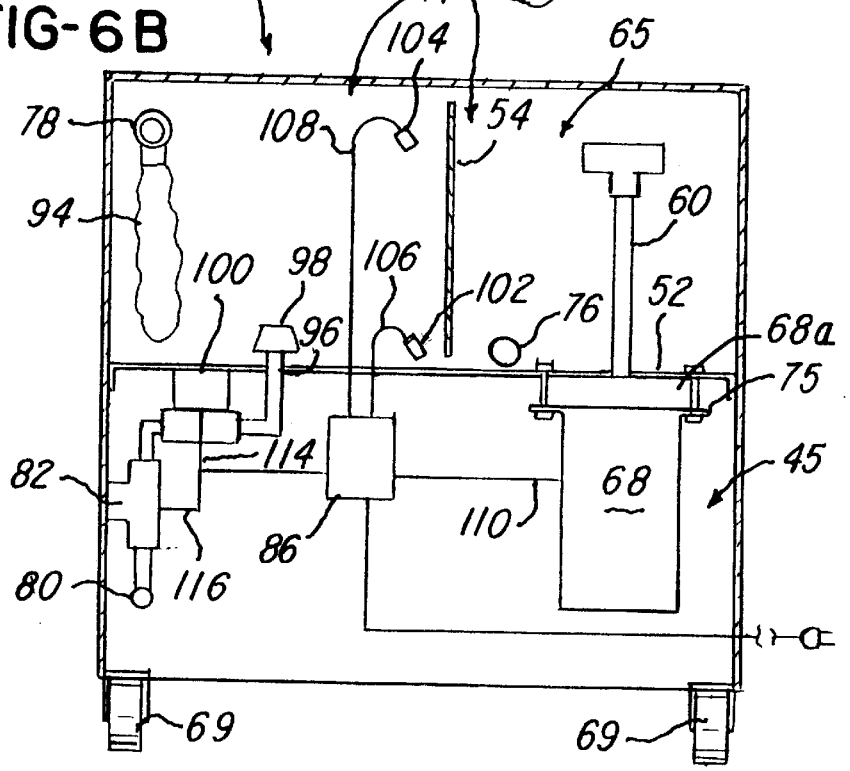
FIG. 6B is a sectional view of the vacuum module shown in FIG. 6A.

Referring now to FIGS. 6A and 6B, the second vacuum module 20 will now be described. The second vacuum module 20 has components which are the same or similar to the components identified with respect to the vacuum module 14 described in FIGS. 2A and 2B. Like components and parts have been identified with the same part numbers. The module 20 is smaller than the module 14 illustrated in FIGS. 2A and 2B and has a second module height (SMH) of 24 inches a second module width (SMW) of 16 inches and a second module length of (SML) of 12 inches.

For ease of illustration, the module 20 is shown without the switches 250, 252, 262 and 268, and fuses 258, 260, and 266, but it should be appreciated that module 20 also comprises manual switches and fuses similar to those described above relative to module 14, except there is need for only one motor switch and fuse because there is only one motor 68 in the module 20.

The dimensions of this module 20 make the device very portable and suitable for small cleaning jobs, spot cleaning, or as a vacuum boost assist device. The module 20 may be used in conjunction with another vacuuming source (not shown) operated away from the vehicle 12, although it should be appreciated that it could be used while mounted in the vehicle 12. When used in conjunction with another vacuuming source (not shown), the vacuum generated by the module 20 boosts the vacuum of the other vacuum source by at least 120 cfm, which is useful during operations where multiple wands 44 (FIG. 2A) or a long vacuum tube 42 (in excess of 200 feet) are required, such as during a cleaning operation in a multi-story building.

Unlike the module 14 in FIG. 2A, which is a two-piece construction, the module 20 (FIG. 6A) comprises a one-piece housing 43 having a floor 52 separating the motor area 45 from the wastewater area 47. It should also be appreciated that the wastewater holding capacity of the module 20 is on the order of 12 gallons, which is less than that of the module 14 illustrated in FIG. 2A. Like module 14, the module 20 comprises the EPO circuit 86 (FIG. 3), except the switch 124 is connected to only a single switch reluctance vacuum motor 68, which is the only motor in the module 20.

The module 20 further comprises the pump-out pump 82, and solenoid valve 100 which are coupled to circuit 86 described earlier so that the wastewater is automatically drained from the module 20 when it accumulates in excess of a desired or predetermined level, as described earlier herein relative to the embodiment shown in FIGS. 2A and 2B. As with the vacuum module 14 illustrated in FIG. 2A, the module 20 comprises the manual dump-valve 76 to dispose of the wastewater in the event the pump-out pump 82 should fail or if the operator simply desires to dispose of the wastewater manually.

As with the module 14 in FIGS. 2A–2B, illustrated in FIGS. 2–2C, the motor 68 is a three-stage switch reluctance motor comprising the gasket seal 68a that engages the seals against the underside 52a of floor 52 when the motor 68 is mounted to floor 52 with bolts 75. The motor 68 is under control of the EPO circuit 86 and operates in a manner similar to the module 14 described earlier herein relative to FIGS. 2A–2B. During operation, the motor 68 creates a vacuum in the wastewater collection area 65 that causes vacuum through hose 99 and wand 44. Alternatively, the module 20 may be coupled to a second vacuum source (not shown) if vacuum boost or debris filtering is needed with inlet 113 which is then coupled to another unit 199 (as described relative to FIG. 14).

Figure 7:
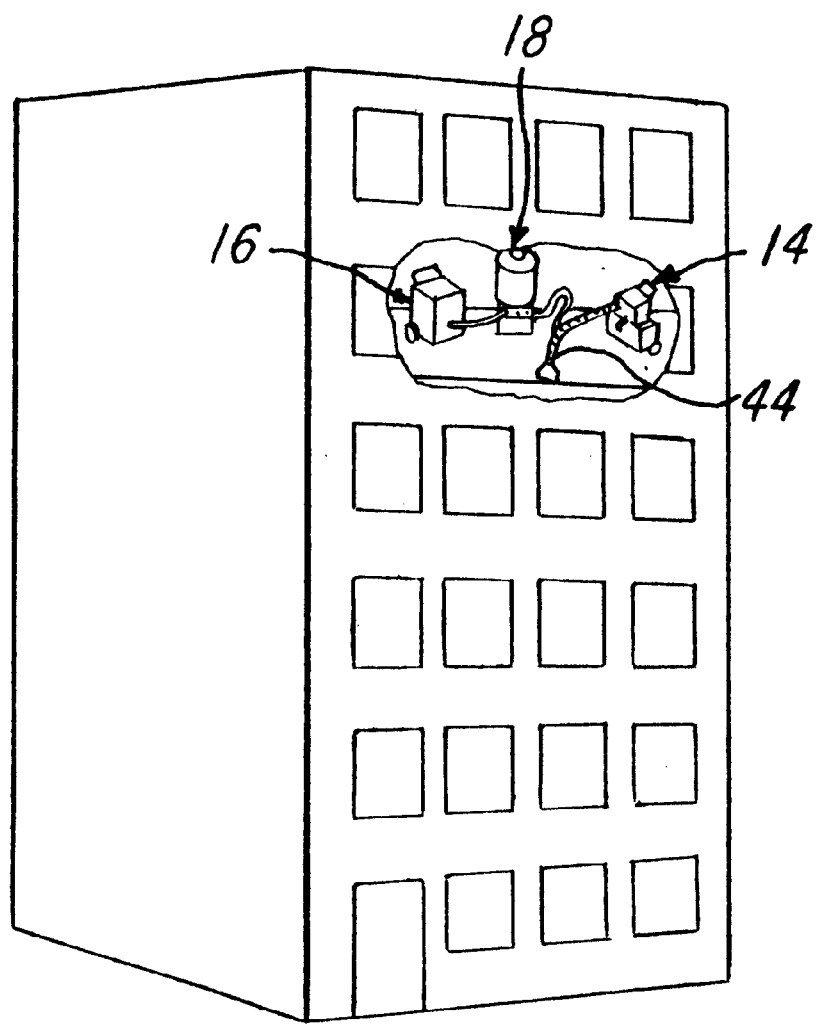
FIG. 7 is a fragmentary view illustrating a use of the portable module system in a building not easily accessible with vacuum and pressure hoses from a vehicle.

Notice in FIGS. 6A and 6B the module 20 comprises a plurality of coasters or wheels 69 which facilitate moving or transporting the module 20 to locations which make operation of the module from vehicle 12 difficult such as in a multi-floor complex or building of the type illustrated in FIG. 7. Although not shown, a two-wheeled dolly with ten-inch pneumatic tires may be furnished to further facilitate the quick transportation of module 20 outside vehicle 12.

The following Table 2 summarizes the various dimensions of the modules 14–20:

TABLE 2

| Module | Length | Height | Width | Fluid Storage Capacity | Vacuum Capacity (cfm) |
|---|---|---|---|---|---|
| Tank 40 | 14" | 26" | 23" | 15 gallons | 220 |
| Housing 74 | 23" | 12" | 14" | N/A | N/A |
| Module 16 | 19½" | 40" | 23" | 2½ gallons | N/A |
| Module 18 | 16" | 43" | 16" | N/A | N/A |
| Module 20 | 12" | 24" | 16" | 11 gallons | 110 |

Figure 8:
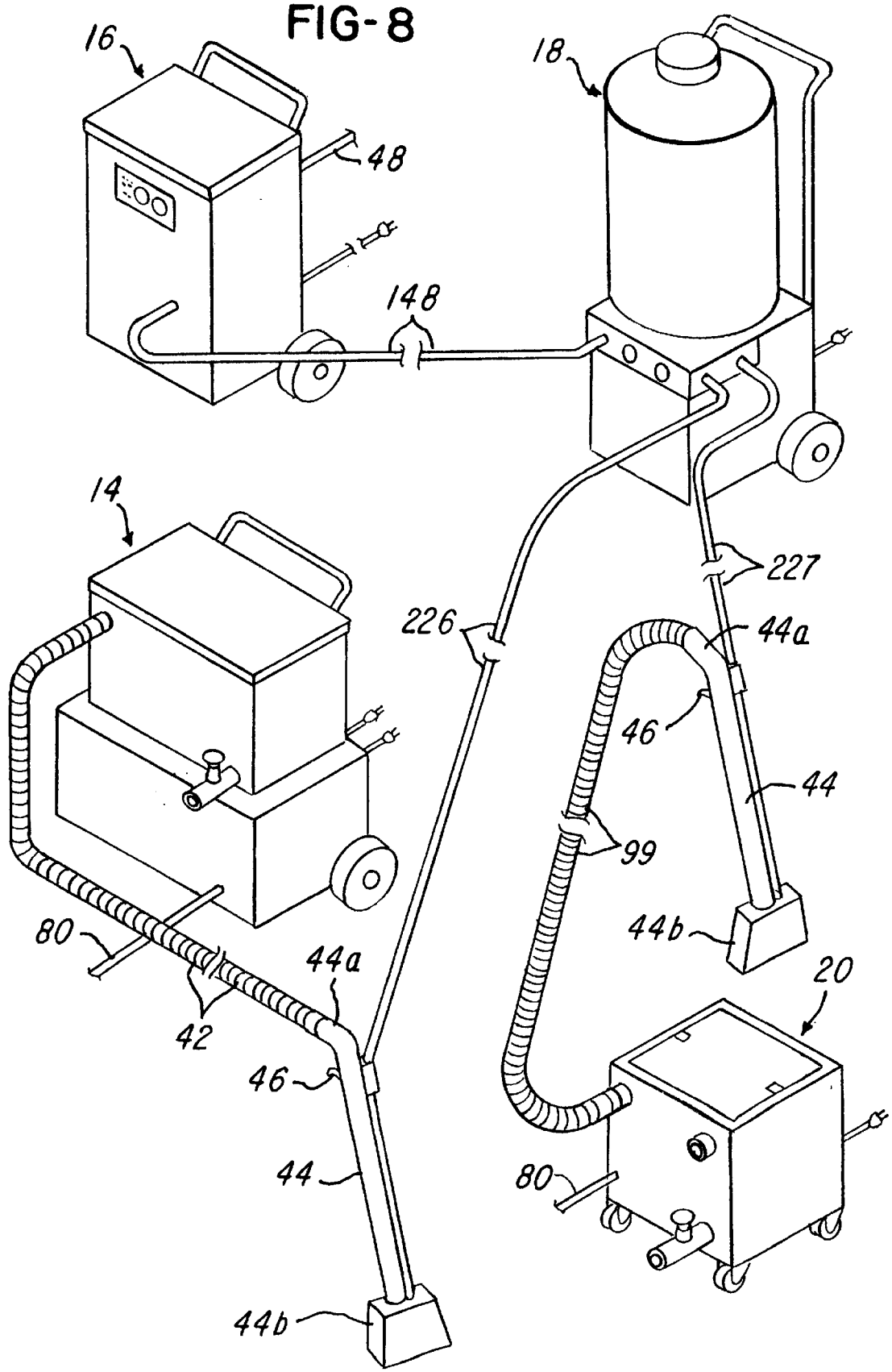
FIG. 8 is an illustration of one arrangement of the portable modules in accordance with one embodiment of the invention.
Figure 9:
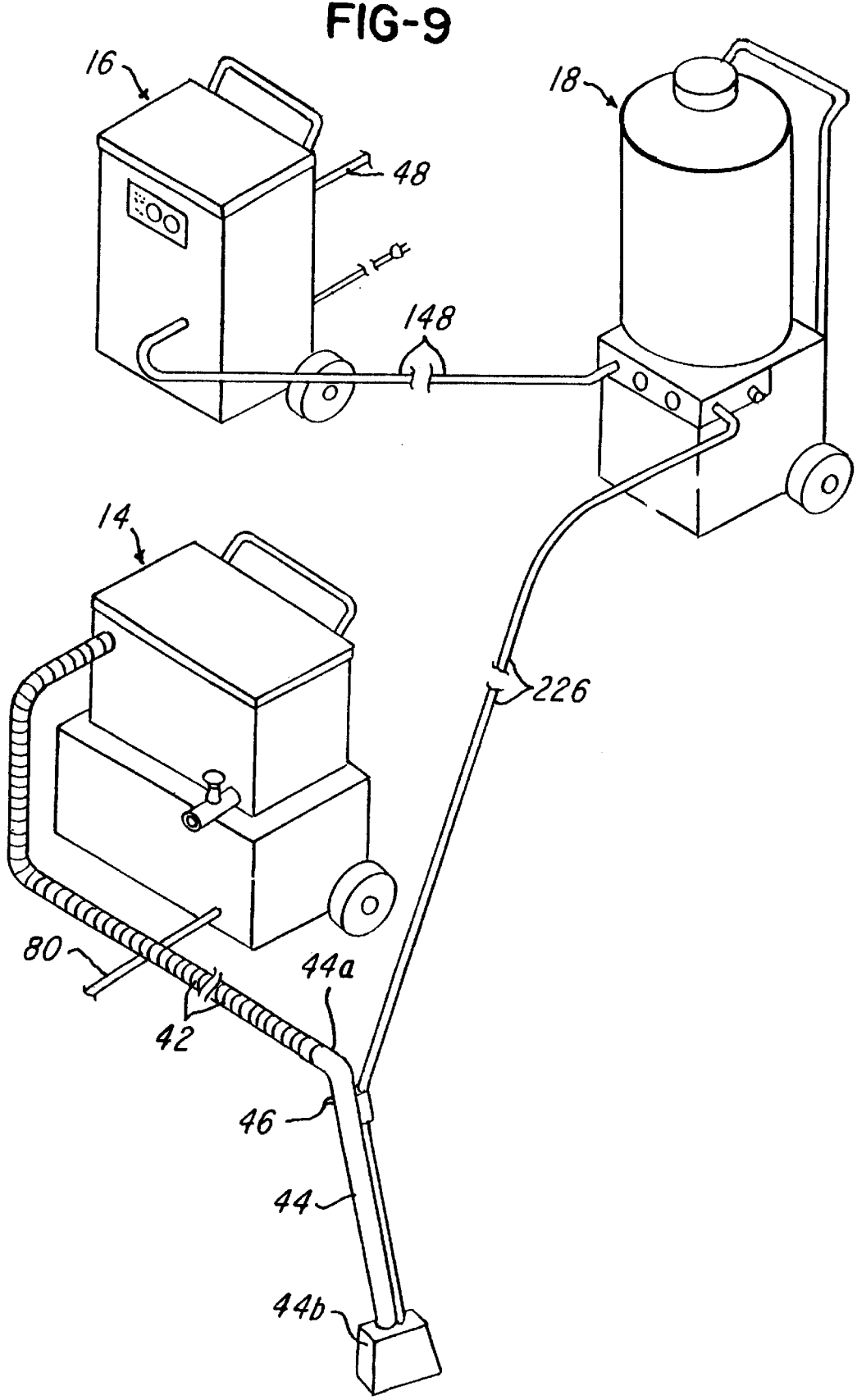
FIG. 9 illustrates an arrangement of the portable modules in accordance with another embodiment of the invention.

FIGS. 8–15 illustrate several typical environments and arrangements depicting one or more of the modules 14–20 comprising system 10. Advantageously, the system 10 high power capability in places that have traditionally been hard to reach by vacuum systems of the past. For example, FIG. 8 illustrates an arrangement for use by two operators and FIG. 9 shows a single operator arrangement. During each operation, the operator(s) remove the modules 14–20 from the vehicle 12 and wheel them to the location to be cleaned. The sizes of the components permit the modules 14–20 to be wheeled into doors, stairways, and up elevators so that the entire system 10 can be easily set up remotely from vehicle 12, yet provides at least 330 cfm amount of vacuum and cleaning power as conventional truck mount cleaning systems.

After the modules 14–20 are individually moved using handles 92, 140 and 210 for modules 14, 16 and 18, respectively, and module 20 is transported via the two wheeler described earlier to the desired location, the operator(s) connect lines 42, 48, 148, 226, 227 and 99 as shown, with each unit being plugged into a wall or other AC outlet (not shown).

As shown in FIG. 8, the pressure module 16 is coupled to the heater module 18 and supplies pressurized mixture of water and cleaning solution to the module 18. The module 18 heats the pressurized mixture that is supplied to the wands 44. The main vacuum module 14 and the smaller vacuum extractor module 20 are also coupled to the wands 44 as shown. The operator(s) begin cleaning by depressing trigger 46 on wands 44 to apply pressurized hot water to the area to be cleaned as the modules 14 and 20 provide vacuum to collect the wastewater. This arrangement enables two operators to use separate wands 44 with high pressure, high heat and high vacuum capacity.

The wastewater from the modules 14 and 20 is automatically pumped out in response to circuit 86 and delivered to the sewer (not shown) via inlet opening 80. The operator(s) can operate the wands 44 at the same time and at different locations as desired. It should be appreciated that, depending on the application, each of the vacuum lines 42, 99 and the pressure lines 148, 226 and 227 will have a length selected in accordance with the cleaning operation to be performed. Thus, if it is a small enclosed cleaning environment, shorter lines may be selected. In such circumstances, modules 14–20 are removed from the vehicle 12 and transported to the cleaning location. Then relatively short vacuum lines 42 and 99 and shorter pressure lines 148, 226 and 227 may be used. If, for example, the pressure module 16 remains mounted in vehicle 12, then longer lines 148 may be used. Module 16 and heater module 18 will usually be used close to one another, either in vehicle 12 or out, but they may be separated by over 10 feet while in operation. Longer lines 148, 226 and 227 are typical in applications where the system is being used in cleaning locations longer than 150 feet, for example.

The illustration in FIG. 8 has been found to be very efficient when more than two rooms have to be cleaned. The two operators can work independently, while cleaning with both high water pressure heat and vacuum levels. The two-wand arrangement enables both operators to work in the separate rooms, or even in a single large room, to efficiently and quickly clean the surface. In this arrangement, the pressure module 16 pressurizes the fluid and delivers it through line 148 to the heater module 18. The cleaning solution is metered as described earlier herein. Once pressurized, the solution travels through the pressure line 172 to the heater module 18.

As the fluid solution passes through the coil 204 of the heater module 18, it is super heated to the desired temperature, which in the embodiment being described is between 0–302 degrees and is set by the operator on the thermostat 232 located on the front panel 142 of the heater module 18. After the fluid is heated, an internal splitter or manifold 246 (FIG. 5A) splits the heated, pressurized fluid into the two separate one-quarter inch inner diameter solution feed connectors or lines 226 and 227, which are then fed to the wands 44 in FIG. 8. The wands 44 apply the pressurized mixture of hot water and cleaning solution through the lines 226 and 227 to wand head 44b (FIG. 1) to the surface to be cleaned. The suspended soil and dirt is collected through the vacuum hoses 44 and 99 into the modules 14 and 20, respectively. The filter bag 94 (FIGS. 2B and 6A) collects large debris.

As mentioned earlier herein, each of the modules 14 and 20 have the pump-out pump 82 and EPO circuit 86, which automatically activates pump 82 to pump wastewater out of the modules 14 and 20 when the wastewater reaches a predetermined level in the manner described earlier. The wastewater is then pumped into a sanitary sewer disposal opening through a three-quarter inch, six gallon per minute hose 80 as shown. As mentioned earlier, during the pump-out operation, the vacuum generated by motors 68 and 70 is interrupted for less than about five seconds for each of the modules 14 and 20.

With the arrangement shown in FIG. 8, as well as the other arrangements, it should be appreciated that each of the modules 14–20 may be removed entirely from the vehicle 12, especially when performing an operation in a location that is over 150 feet from the vehicle 12 or where one or more of the modules 14–20 is removed from the vehicle 12.

FIG. 9 illustrates a similar mode of operation to that shown in FIG. 8, except that there is only one wand 44 being used by a single operator (not shown), so the second vacuum extraction module 20 is not used or coupled to the heater module 18. This arrangement is typical when only one wand is used. Again, it should be appreciated that one or more of these modules 14, 16 and 18 may be entirely removed from the transport vehicle 12 with electrical power being provided by wall outlets (not shown) in the building or structure being cleaned, rather than the on-board power generator 28 (FIG. 1) in the vehicle 12.

Figure 10:
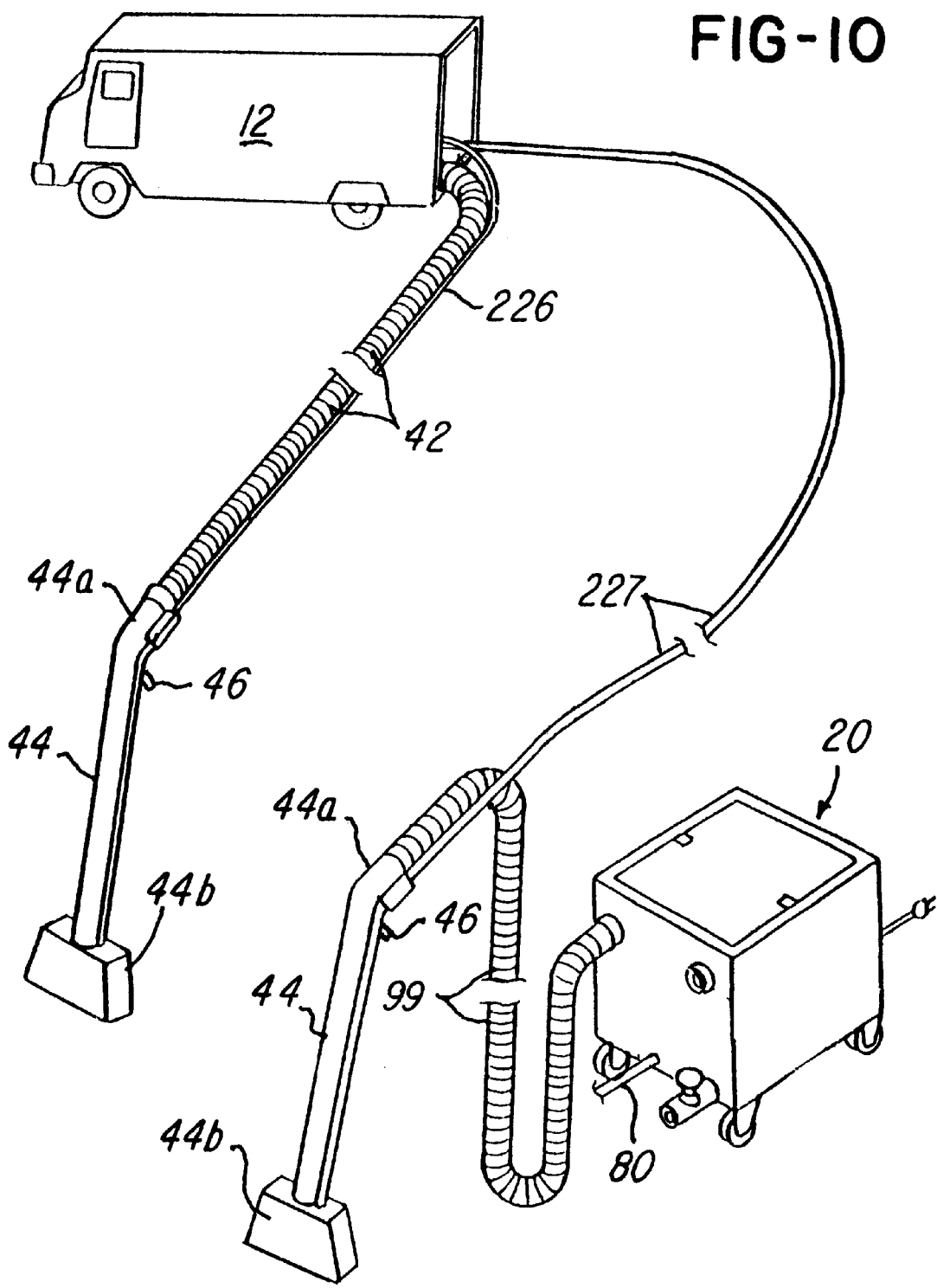
FIG. 10 is still another arrangement of the portable modules in accordance with another embodiment of the invention.

FIG. 10 illustrates another mode of operation. In this arrangement the main extraction module 14, pressure module 16 and heater module 18 remain in the vehicle 12 while the second vacuum module 20 is removed from the vehicle and used in the building. During this mode of operation, power is provided to the modules 14–18 by the conventional on-board electrical generator 28. This arrangement has been found to be useful when a maximum distance between the cleaning area and the vehicle 12 does not exceed 150 feet, which is not unusual when two technicians are cleaning a single story residence (not shown). At this distance, the main vacuum module 14 and second vacuum module 20 give much greater vacuum recovery power on the order of about 330 cfm through the recovery hoses 42 and 99, respectively, when compared to when two wands are vacuuming using a single vacuum source. In the embodiment being shown in FIG. 10, the clean water supplied to the pressure module 14 is provided by the fresh water tanks 24 and 26 (FIG. 1) that are capable of supplying up to 100 gallons of fresh water to pressure module 16 for the cleaning operation. The operation of the modules 14–20 and the wands 44 operate in substantially the same manner as described relative to FIG. 8.

Figure 11:
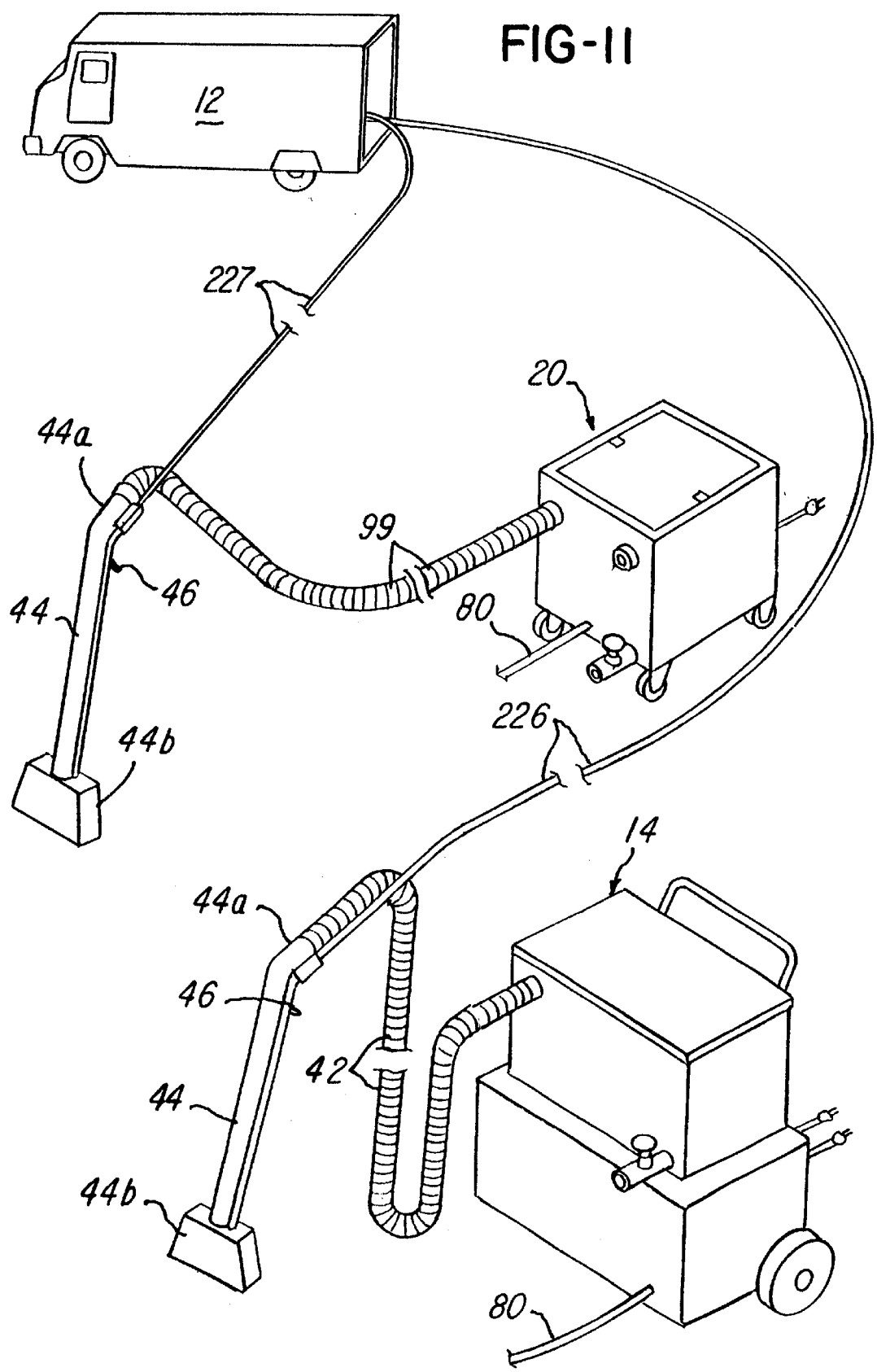
FIG. 11 is yet another arrangement of the portable modules in still another embodiment of the invention.

FIG. 11 illustrates still another mode of operation where a distance between the vehicle 12 containing the modules 14–20 and the location to be cleaned is between 150 feet and 400 feet and where dual wand 44 operation is desired. In this embodiment, the first vacuum extraction module 14 and second vacuum extraction module 20 are placed in the job site. Pressurized lines 226 and 227, which have an inner diameter of one-quarter inch, have the desired length up to 400 feet are used to supply the hot, pressurized mixture of water and cleaning solution from the heater module 18 which remains in vehicle 12. Thus, it should be appreciated that an important feature of the invention is that the modules 14 and 20 can eliminate or reduce the need for long vacuum hoses 44 and 99, which tend to diminish the suction power of the vacuum modules 14 and 20.

In the mode of operation illustrated in FIG. 11, relatively short vacuum lines 44 and 99 of less than about 25 feet may be used. This enables the operators to maintain a high degree of vacuum extraction power, even when the modules 14 and 20 are used a long distance away from the vehicle 12.

Figure 12:
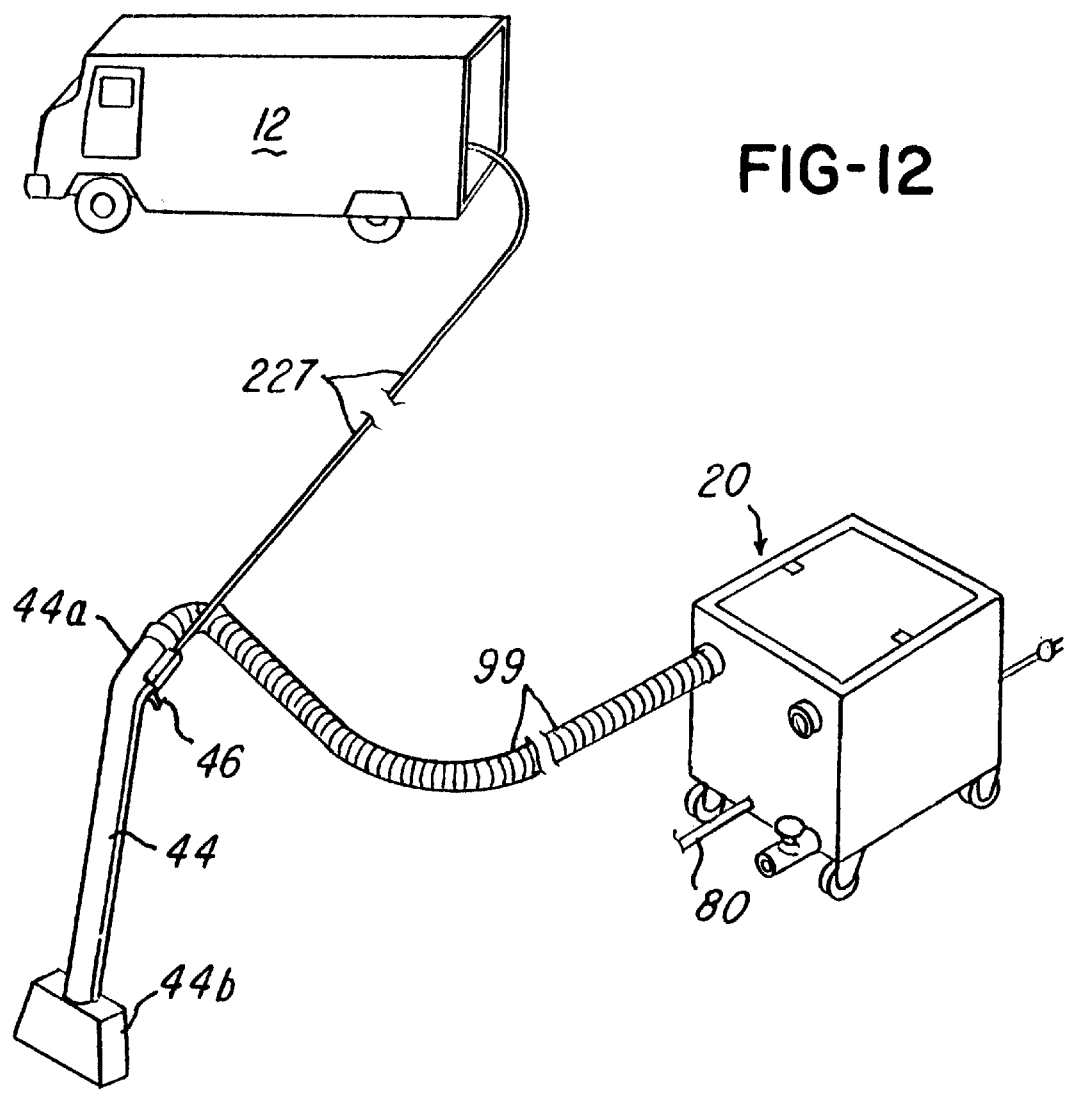
FIG. 12 is an illustration of another arrangement and use of the vacuum modules in accordance with another embodiment of the invention.

FIG. 12 illustrates a similar concept, except a single operator uses the second vacuum module 20 at the cleaning area. Because the second module 20 is smaller than the main vacuum extractor module 14, it is more portable and easier to move around between or among a number of rooms and in small locations. Notice that the modules 14–18 remain in vehicle 12 during this mode of operation.

Figure 13:
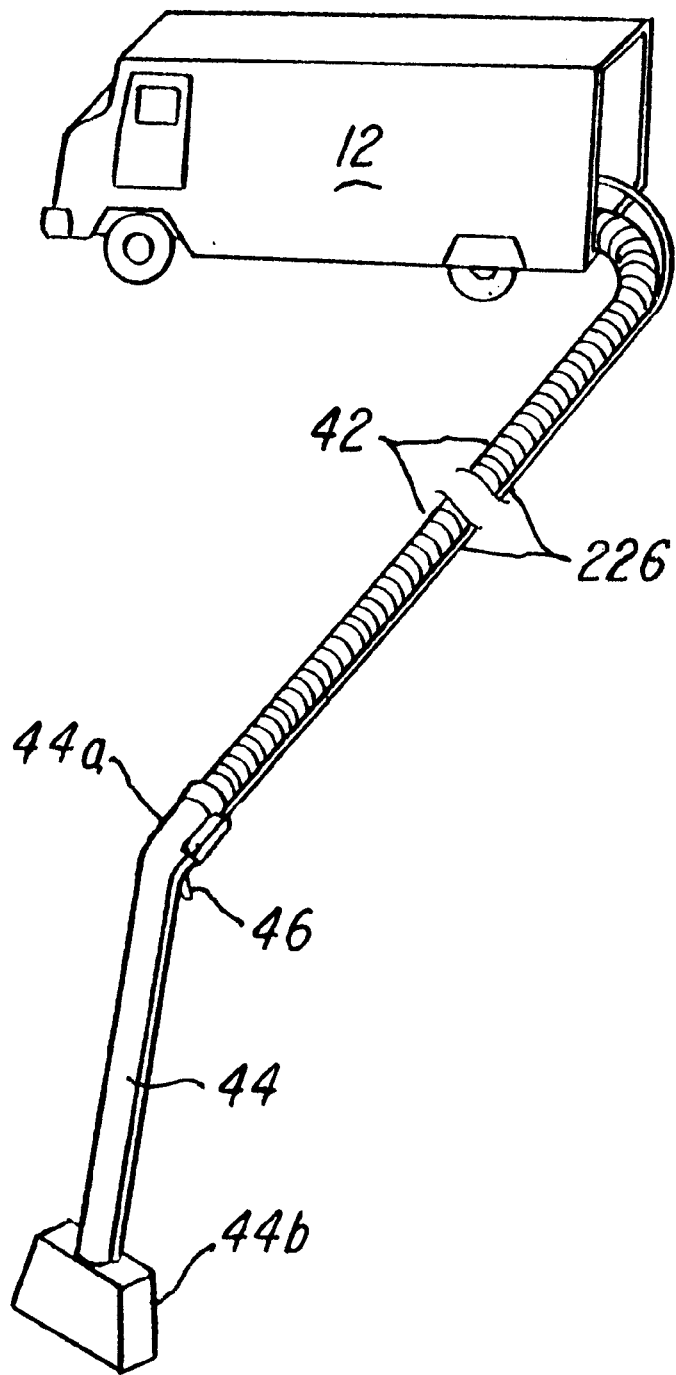
FIG. 13 is an illustration of another arrangement of the portable vacuum modules in a vehicle illustrating another embodiment of the invention.

FIG. 13 illustrates one of the simplest arrangements when all of the portable modules 14–20 remain within the vehicle 12 and the wand 44 is operated remotely from the vehicle 12 at the cleaning location as shown. In this operation, the power for the modules 14–20 is provided by the vehicle's 12 power generator 28. The water supply is provided by the tanks 24 and 26 to the pressure module 16, which provides the pressurized mixture of water and cleaning solution to the heater module 18 and, ultimately, to the wand head 44b. In this embodiment, the vacuum recovery hose 42 may be of any length, but it is desirable that this mode of operation be performed at less than 150 feet so that the vacuum recovery power is not diminished as a result of excessive length of the recovery hose 44.

Advantageously, this invention does not require vacuum boost for long distances because both modules 14 and 20 can be located a short distance from the wand(s) 44 if need be. However, another feature of the second vacuum extractor module 20 is that it may operate as a filtering and trapping device between the area to be cleaned and a second vacuum/extractor unit 199 (FIG. 14), which may be a conventional truck-mount unit. The line 400 is coupled to the second vacuum/extractor unit 199. In the embodiment shown in FIG. 14, the module 20 is used as a filtering and trapping device for all particulate matters extracted from the area being cleaned for proper disposal at the end of the work day. In this arrangement, the filter bag 94 (FIGS. 2A and 6A) catches debris as wastewater is vacuumed first through module 20 and then to the main extraction unit 199. As described earlier herein, the module 20 comprises the electronic pump-out circuit 82 which pumps the wastewater into the nearest approved sanitary disposal drain. Thus, this arrangement in FIG. 14 facilitates filtering and trapping particulate matter before such matters reach the main vacuum/extractor 119.

Figure 14:
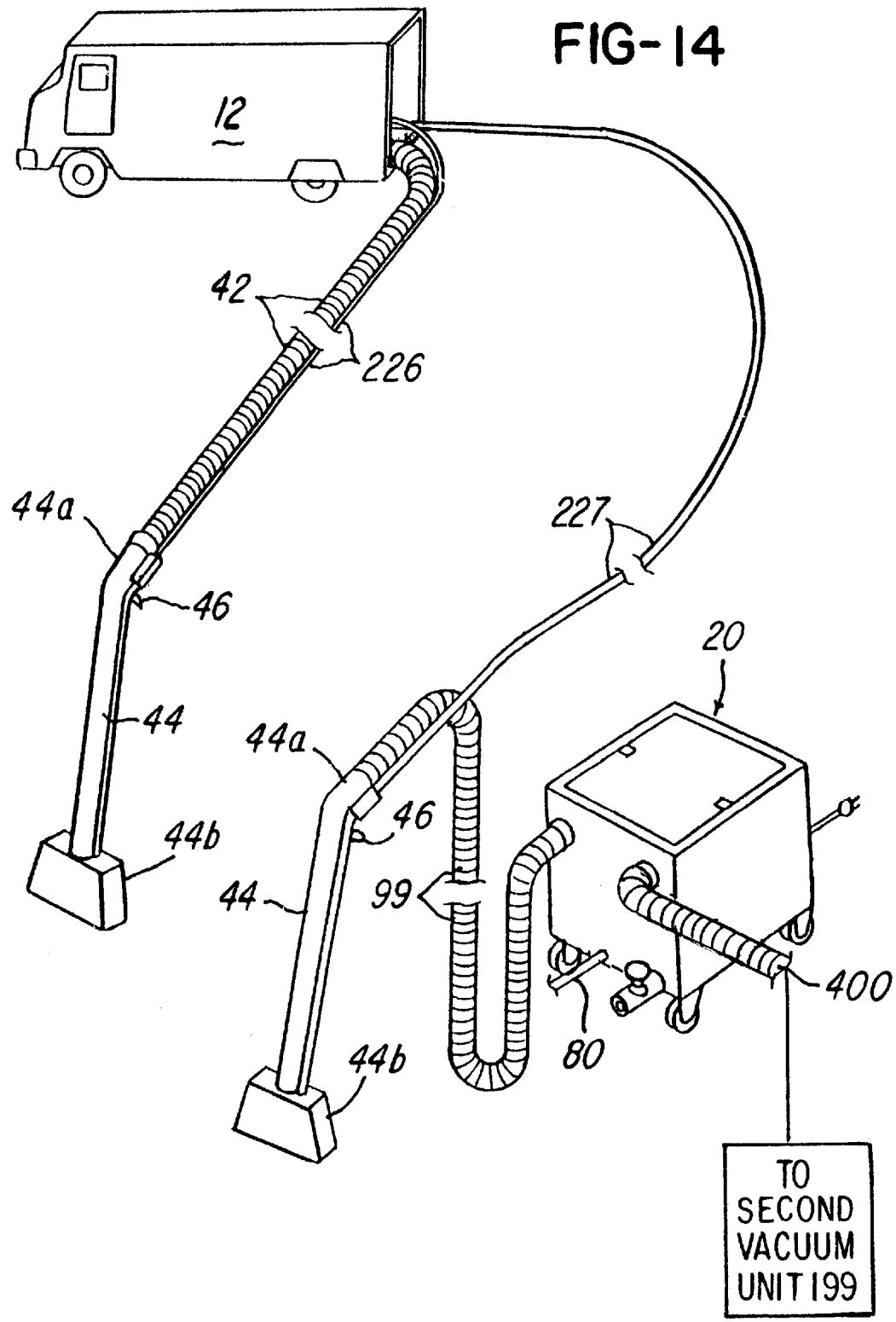
FIG. 14 is yet another arrangement of the portable modules illustrating another arrangement in accordance with another embodiment of the invention.

FIG. 14 shows the module 20 used in conjunction with unit 199, which is conventional truck-mount unit. This arrangement may also be used when it is desired to provide additional vacuum boost for the main vacuum unit 199 that does not have the proper amount of vacuum for the operation being performed or when a long hose 400 is used. For example, the module 20 can be used where an operator only has access to the module 20, yet has an operation which requires the recovery hose, such as hose 400 in FIG. 14 to be in excess of 150 feet, then it may be desired to provide vacuum boost between the wand 44 and the vacuum/extractor unit 199. As mentioned earlier herein, it has been found that when the length of the vacuum hose 400 is longer than about 150 feet, it is desirable to use the module 20 to provide the additional vacuum.

Figure 15:
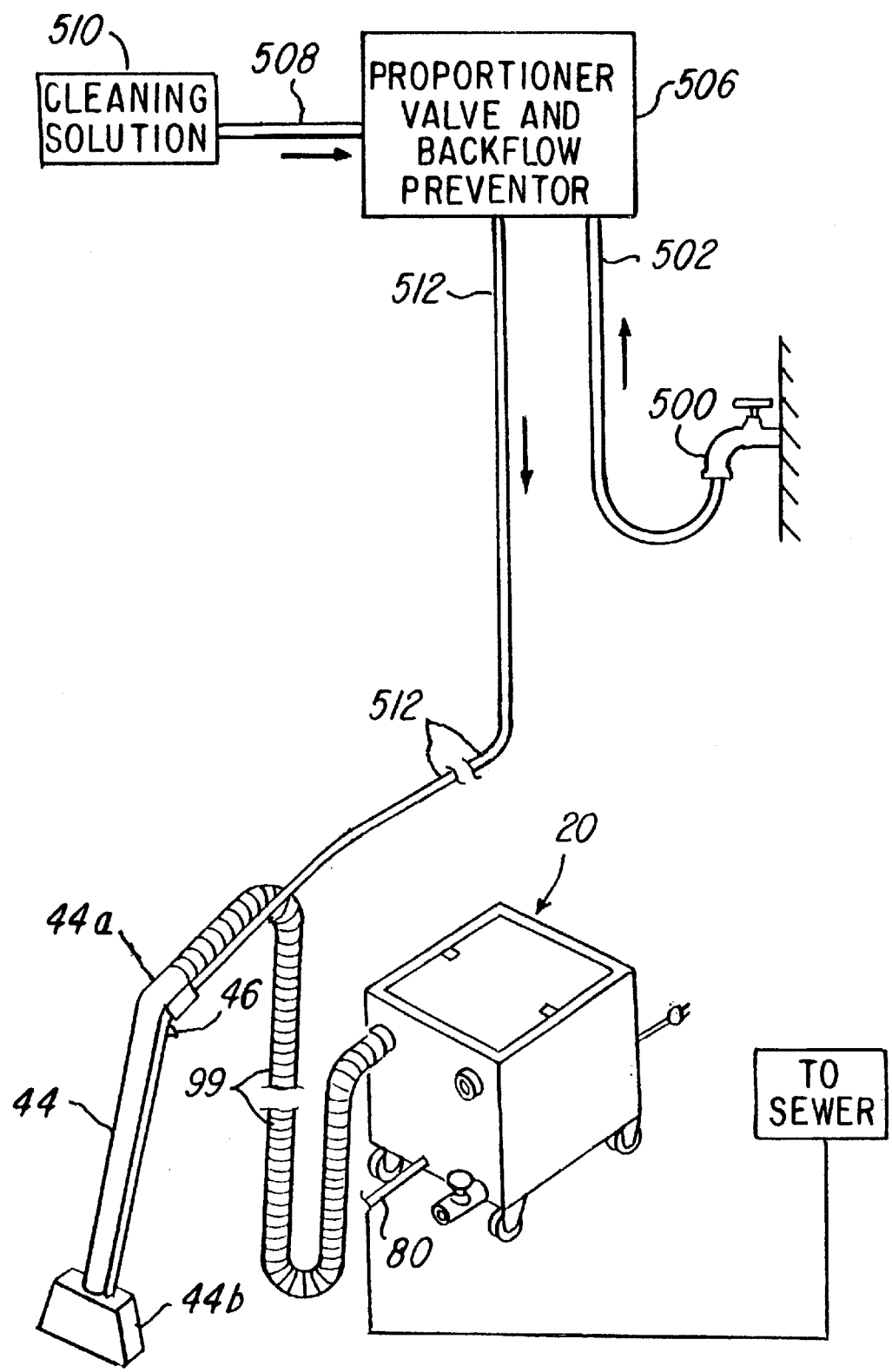
FIG. 15 is another arrangement illustrating the use of the portable vacuum modules in accordance with another embodiment of the invention.

Still another mode of operation is illustrated in FIG. 15. In this embodiment, the vacuum module 20 is used in the building being cleaned and is supplied with hot water from a typical hot water spigot or outlet 500 in the building. Water flow, pressure and heat are secured through the hose 502, which in the embodiment being described is a three-eighths inch inner-diameter hose, which connects to the hot water spigot 500. A proportioner valve 506 with back-flow preventer 504 is inserted past the spigot 500. The proportioner valve 506 comprises a connection 508 to a cleaning solution 510 which is proportioned into the water flow from the spigot 500, thereby providing a mixture of chemical cleaning solution with the water that is delivered to the wand 44 through line 512. The moisture-laden soil and dirt is then extracted through the hose 99 as described earlier. Although this arrangement does not provide the high-pressure heated fluid of the type provided when the pressure module 16 and heater module 18 are used, it is an adequate mode of operation for very small jobs or carpet that is not moderately soiled, which do not require high fluid pressure or heat. This mode of operation is particularly useful when an operator is performing a very small cleaning job, such as cleaning one or more spots or stains from the surface being cleaned.

Figure 16:
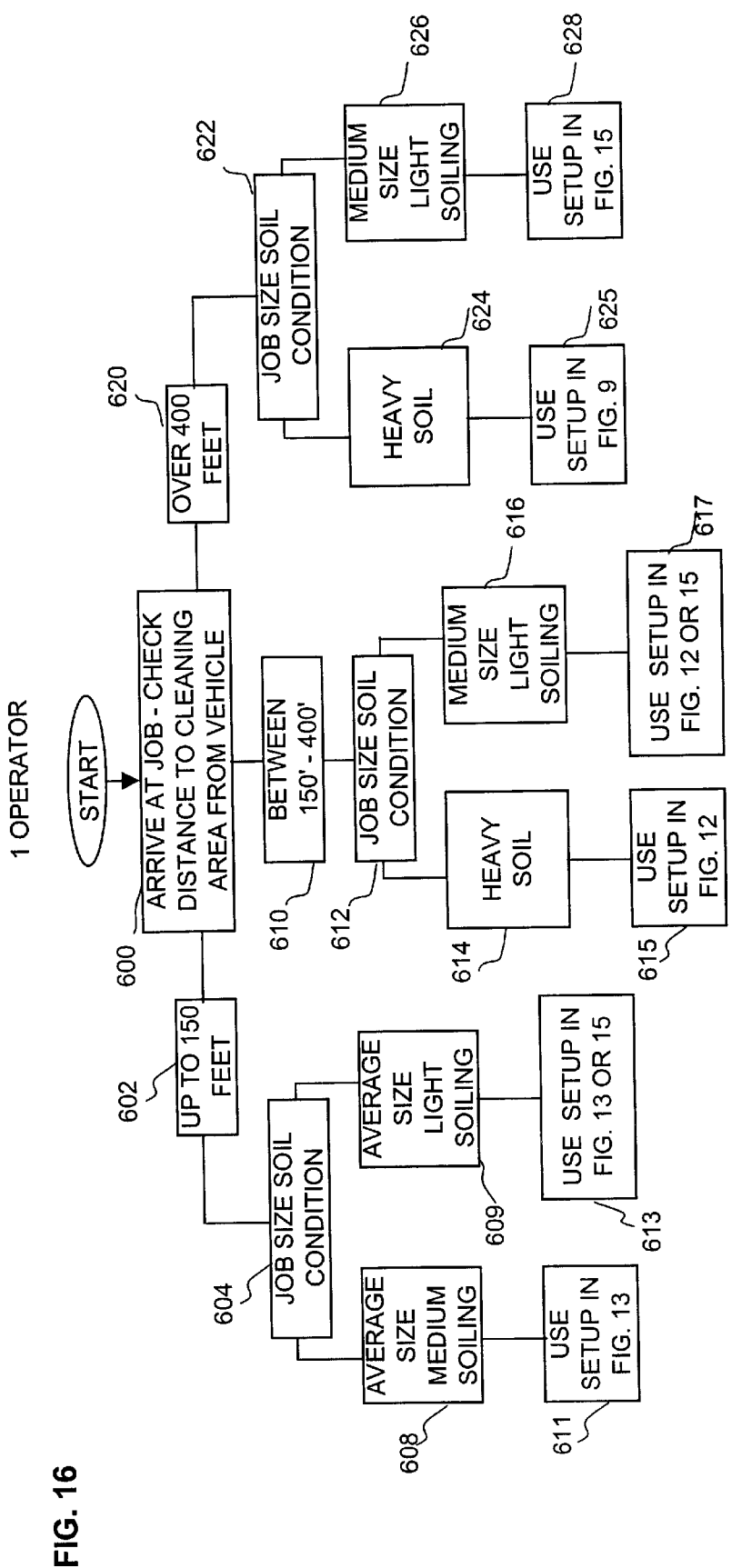
FIG. 16 is a schematic diagram illustrating a process for selection and use of the portable modules.

A method and process of selecting and arranging the modules 14–20 will now be described relative to FIGS. 16 and 17. FIG. 16 illustrates a method or procedure a single operator may follow in selecting the modules 14–20 and arrangement thereof.

During this operation, the operator evaluates the area(s) to be cleaned and determines the distance between the area to be cleaned and the vehicle 12 at Block 600. If the operator determines (Block 602) that the distance is less than 150 feet, then the operator proceeds to determine the soil condition of the area to be cleaned (Block 604). If it is an average size medium soiled condition (Block 608), then the setup illustrated in FIG. 13 is used (Block 611). Medium soil is some spots and stains, but not an overall soil impacted condition, such as the condition that occurs in traffic lanes. If the determination at Block 604 is that the soiling condition is less than medium (Block 609), then the operator will typically choose the setup shown in FIG. 13 or FIG. 15 (Block 613).

If at Block 600 the operator determines that the distance is between 150 feet and 400 feet (Block 610) then the operator determines the job size soil condition (Block 612). If the cleaning surface is heavily soiled (Block 614), then the operator may choose the setup illustrated in FIG. 12 (Block 615) in the embodiment being described. If the soiling condition is less than heavy (Block 616) then the operator uses the setup illustrated in FIG. 12 or FIG. 15 (Block 617).

If the operator determines that the distance between the vehicle 12 and the area to be cleaned is over 400 feet (Block 620), then the operator determines the job site soil condition at Block 622 and if it is heavy (Block 624), the operator uses the setup illustrated in FIG. 9 (Block 625). If the soil condition is less than heavy (Block 626), then the operator uses the setup shown in FIG. 15 (Block 628).

Figure 17:
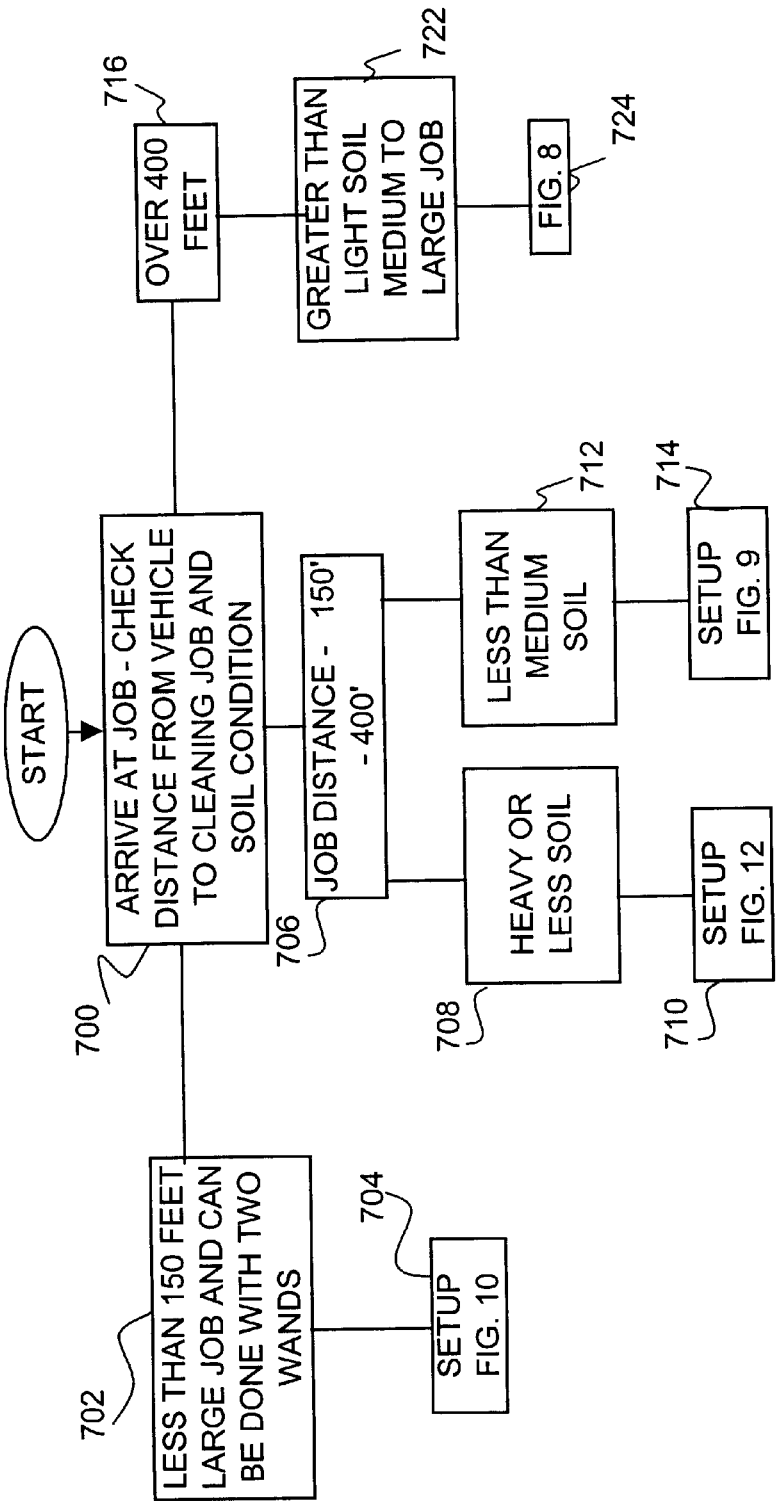
FIG. 17 is another schematic illustrating another process or arrangement for selecting and using the portable modules in accordance with another embodiment of the invention.
Figure 18:
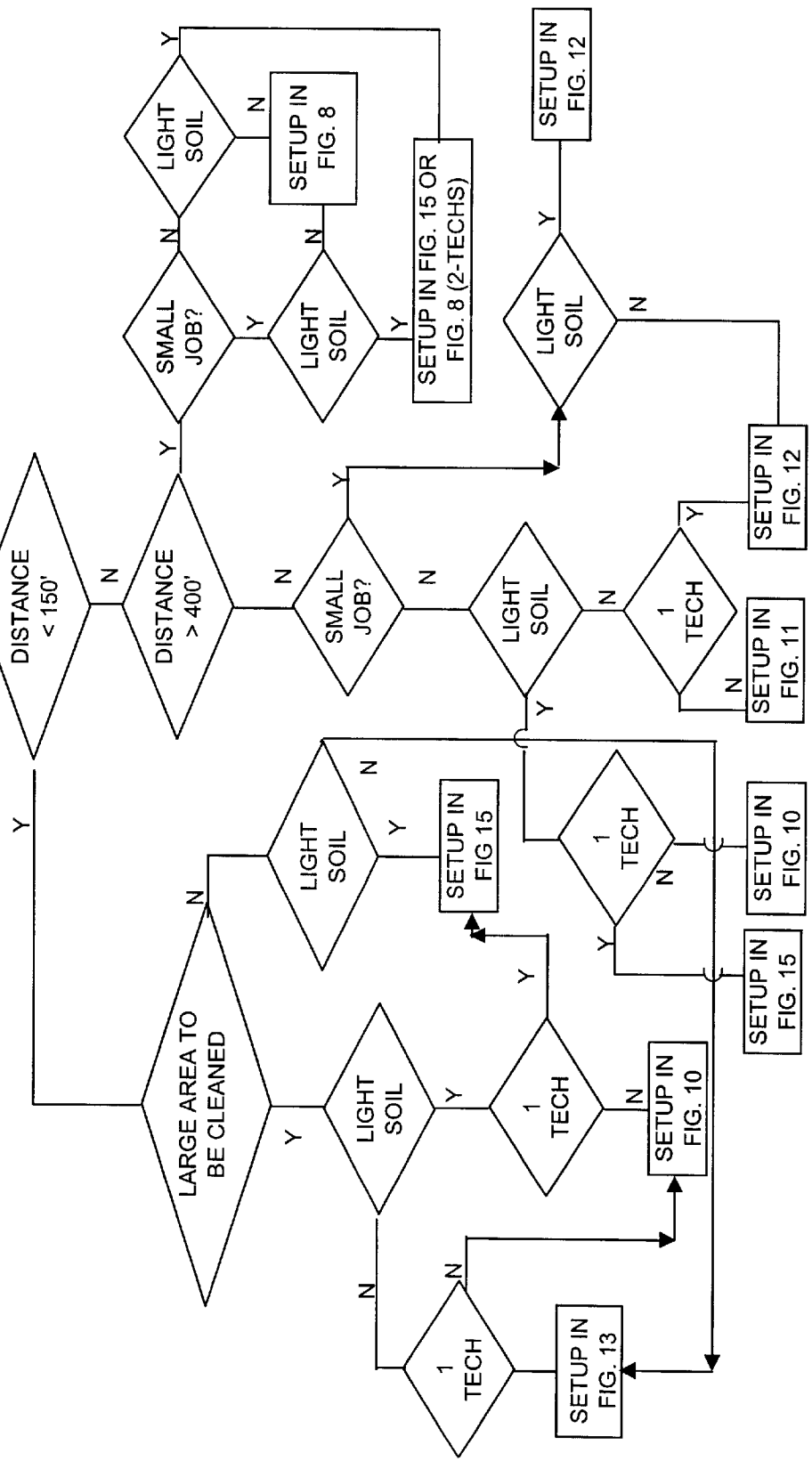
FIG. 18 is still another process illustrating another methodology for using the portable modules in accordance with another embodiment of the invention.

FIG. 17 illustrates a procedure when two or more technicians are available at a site to be cleaned. As with Block 600 in FIG. 16, one or more of the technicians determines the distance between the vehicle 12 and the area to be cleaned and the soil condition of that area to be cleaned (Block 700). If the distance is less than 150 feet and the cleaning area is large or could easily be done using two wands 44 (Block 702), then the setup illustrated in FIG. 10 is used (Block 704).

If the distance between the vehicle 12 and the area to be cleaned is greater than 150 feet, but less than 400 feet (Block 706), it is determined at Block 708 whether the soiling condition of the area to be cleaned is medium soiling or less. If it is, then the mode of operation illustrated in FIG. 11 may be used (Block 710 in FIG. 17). If the soiling condition is determined to be greater than medium (Block 712 in FIG. 17), then the setup in FIG. 11 (Block 714) is selected.

When the distance between the vehicle 12 and the cleaning area is determined to be over 400 feet (Block 716) and it is a greater than light soil job (Block 722), the setup shown in FIG. 8 (Block 747) is selected.

For purposes of the illustrations described, "light" soil condition means some small spots, but overall no appearance of soiling, "medium" soil condition means some spots and stains, but no heavy impacted soiling, and "heavy" soil condition means several spots and stains, heavily impacted visible soil. Moreover, a "small area" to be cleaned is less than about 400 square feet, a "medium area" to be cleaned is between 400 square feet and 1,000 square feet, and a "large area" to be cleaned is in excess of 1,000 square feet.

It should be appreciated that other procedures for selecting the arrangement of the modules 14–20 may be used. For example, when a water damage flood extraction is needed, modules 14 and 20 only are used, as there is not need for a pressurized cleaning solution. In this application, continuous extraction can take place because of the EPO pump-out system, with no operator intervention, regardless of the job size. Also, part of the cleaning job involves cleaning upholstery and carpet, and there are two operators, one operator can clean carpet while the other cleans upholstery, using the setup in FIGS. 8, 10 and 11 and/or a combination of the setups illustrated in FIGS. 12, 14 and 15. The module 20 could be used as a vacuum boost to unit 199 (FIG. 14), as mentioned earlier.

The following parts Table III is a list of many of the parts and their associated supplier:

TABLE III

| Part # | Description | Stock Number | Vendor |
|---|---|---|---|
| 100 | Solenoid | 476 24V | Windtrax, Inc. Shawnee Mission, KS |
| 506 | Faucet Proportioner | 154-LA | Windtrax, Inc. Shawnee Mission, KS |
| 130 | CAT 290 Pump | 290 | Windtrax, Inc. Shawnee Mission, KS |
| 166 | Paraplate Back PRS Regulator | 13020 | Windtrax, Inc. Shawnee Mission, KS |
| 118 | Transformer 40 VA | AT 140A-1000 | Windtrax, Inc. Shawnee Mission, KS |
| 124 | Magnetic Motor Contractor 24V 20 Amps | 45CG20AJ | Windtrax, Inc. Shawnee Mission, KS |
| 120 122 | 24V Relay | 1DRH2BU24 | Windtrax, Inc. Shawnee Mission, KS |
| 152 | Lights | MB199-20-Amber | Windtrax, Inc. Shawnee Mission, KS |
| 152 | Lights | SL53415-6-BG Red | Windtrax, Inc. Shawnee Mission, KS |
| 152 | Lights | 110V-Green-L | Windtrax, Inc. Shawnee Mission, KS |
| 70a 62a1 | Vac Gasket | VC2001 | Windtrax, Inc. Shawnee Mission, KS |
| 218 | Flow Switch | ST6 | Windtrax, Inc. Shawnee Mission, KS |
| 226 227 | Pressure Hose | | Windtrax, Inc. Shawnee Mission, KS |
| 42 99 | Vacuum Hose | | Windtrax, Inc. Shawnee Mission, KS |
| 146 | Pressure Gauge | 53615-C151 | Northern Tool Corporation Burnsville, MN |
| 69 | 3" Casters (swivel) | 18974-C301 | Northern Tool Corporation Burnsville, MN |
| 28 | 7000 Watt Generator | ESE 7006 Endress | W. W. Grainger, Inc. Gurnee, IL |
| 82 | Pump-Out Pump | 1P579 | W. W. Grainger, Inc. Gurnee, IL |
| 102 104 | Float Switch | 4RK04 | W. W. Grainger, Inc. Gurnee, IL |
| 162 | Axial Fans | 4WT46 | W. W. Grainger, Inc. Gurnee, IL |
| 200 220 | 220,000 BTU Water Heater | 800022 | Custom Cleaning Systems Tulsa, OK |
| 184 | Thermal Relief Valve | 458000 | Custom Cleaning Systems Tulsa, OK |
| 98 | #50 SS Mesh Strainer | 342312 | Custom Cleaning Systems Tulsa, OK |
| 132 | 1-1/2 HP Electric Motor | 337352 | Custom Cleaning Systems Tulsa, OK |
| 30 | 7.9 Gallon Belly-Mount Propane Tank w/Gauge | 6814 | The Berquist Company Toledo, OH |
| 68 70 | 3-Stage Vacuum Motors | 119389-13 | Ametek Kent, OH |
| 24 26 | 50-Gallon Custom Fresh Water Tanks | 50-C-SS | TM Fabricators Dayton, OH |
| 34 | Van Wall Storage Cabinet | VWC-SS | TM Fabricators Dayton, OH |
| 20 | Ulta-Vac #304 Stainless Tank | | GJ Welding Bellbrook, OH |
| 40 | Main #304 Stainless Tank | | GJ Welding Bellbrook, OH |

It should be appreciated that the distances mentioned of 150 feet, 150–400 feet and over 400 feet between vehicle 12 and the cleaning area are for illustrative purposes only. Soil conditions described herein, area size determinations are also illustrative only and may vary depending on, for example, the sizes of the modules 14–20 and the components such as motors 68 and 70, 132 and coil 204.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defines in the appended claims.

What is claimed is:

1. A cleaning system having a wand comprising:
   a plurality of portable cleaning modules;
   said plurality of portable cleaning modules comprising a heater module comprising:
   a burner for burning fuel received from a fuel supply; and
   a circuit coupled to a valve for controlling fuel flow from said fuel supply to said burner, said circuit permitting said burner to continue burning said fuel until either a predetermined time or a predetermined temperature after said wand ceases delivering fluid to a surface to be cleaned.

2. The cleaning system as recited in claim 1 wherein said plurality of portable cleaning modules comprises a vacuum module comprising:
   a receiving tank for receiving waste water that has been vacuumed, said receiving tank comprising at least one wheel for facilitating transporting said receiving tank;
   at least one vacuum motor for generating a vacuum in said tank;
   at least one port for coupling said receiving tank to at least one vacuum hose;
   said at least one vacuum motor generating a vacuum flow of at least 60 cubic feet per minute.

3. The cleaning system as recited in claim 2, wherein said at least one vacuum motor comprises a plurality of vacuum motors.

4. The cleaning system as recited in claim 2, wherein said receiving tank comprises a plurality of inlets through which water may be collected.

5. The cleaning system as recited in claim 2 wherein said system further comprises:
   a debris collector for collecting debris entering said receiving tank.

6. The cleaning system as recited in claim 5 wherein said debris collector comprises a nylon strainer situated on an inlet port on said receiving tank.

7. The cleaning system as recited in claim 2, wherein said cleaning system comprises an automatic pump-out system for automatically pumping fluid out of said tank.

8. The cleaning system as recited in claim 7 wherein said pump-out system comprises:
   a pump; and
   a solenoid coupled to said pump and said pump-out circuit and responsive to said pump-out circuit to permit fluid to flow between the fluid collection container and said pump.

9. The cleaning system as recited in claim 8 wherein said pump has a capacity of pumping at least 1 gallon per minute.

10. The cleaning system as recited in claim 7, wherein said automatic pump-out system comprises:
    at least one sensor for sensing when the fluid reaches a predetermined level;
    a pump-out circuit coupled to said pump system and said at least one sensor for energizing said pump-out system to pump said fluid out of said fluid collection container when said at least one sensor senses that the fluid has reached said predetermined level.

11. The cleaning system as recited in claim 10, wherein said cleaning system further comprises:
    said at least one sensor comprising a first sensor for sensing when said fluid reaches a first predetermined level and a second sensor for sensing when said fluid reaches a second predetermined level;

said pump-out circuit being responsive to said first and second sensors for maintaining said fluid between said first and second predetermined levels.

12. The cleaning system as recited in claim 11, wherein said first and second sensors are float sensors.

13. The cleaning system as recited in claim 12, wherein said pump-out circuit is coupled to said vacuum motor and terminates power to said vacuum motor when said fluid is being pumped by said pump system.

14. The cleaning system as recited in claim 1 wherein said plurality of portable cleaning modules further comprise:
said heater module capable of heating fluid to a predetermined temperature;
a vacuum module capable of vacuuming said fluid at least 60 cubic feet per minute.

15. The cleaning system as recited in claim 14 wherein said plurality of portable cleaning modules further comprise:
a pressure module coupled to said heater module for pressurizing said fluid to at least 80 pounds per square inch.

16. The cleaning system as recited in claim 14 wherein said plurality of portable cleaning modules further comprise:
a second vacuum module capable of vacuuming said fluid at a flow rate of at least 60 cubic feet per minute.

17. The cleaning system as recited in claim 2 wherein said heater module comprises:
a coil for receiving said fluid;
a heater for heating said coil;
a control valve for controlling heating of said coil;
a bypass circuit for permitting heating of said fluid when said fluid does not flow through said coil.

18. The cleaning system as recited in claim 17 wherein said bypass circuit permits heating of said fluid until said fluid reaches said predetermined temperature.

19. The cleaning system as recited in claim 18 said predetermined temperature is between 50–280 degrees Fahrenheit.

20. The cleaning system as recited in claim 14 wherein said predetermined temperature is between 50–280 degrees Fahrenheit.

21. The cleaning system as recited in claim 14 wherein said vacuum module comprises an automatic pump-out system for automatically pumping fluid out of said vacuum module when said fluid reaches a predetermined level in a fluid collection container.

22. The cleaning system as recited in claim 21 wherein said automatic pump-out system further comprises:
a pump system;
at least one sensor for sensing when the fluid reaches said predetermined level;
a pump-out circuit coupled to said pump system and said at least one sensor for energizing said pump system to pump said fluid out of said fluid collection container when said at least one sensor senses that the fluid has reached said predetermined level.

23. The cleaning system as recited in claim 22 wherein said pump system comprises:
a pump; and
a solenoid coupled to said pump and said pump-out circuit and responsive to said pump-out circuit to permit fluid to flow between the fluid collection container and said pump.

24. The cleaning system as recited in claim 22 wherein said system further comprises:
said at least one sensor comprising a first sensor for sensing when said fluid reaches a first predetermined level and a second sensor for sensing when said fluid reaches a second predetermined level;
said pump-out circuit being responsive to said first and second sensors for maintaining a level of said fluid is maintained between said first and second predetermined levels.

25. The cleaning system as recited in claim 24, wherein said first and second sensors are float sensors.

26. The cleaning system as recited in claim 25, wherein said pump-out circuit is coupled to a vacuum motor and terminates power to said vacuum motor when said fluid is being pumped by said pump system.

27. A cleaning system comprising:
a plurality of portable cleaning modules;
said plurality of portable cleaning modules being usable either inside a vehicle or inside a building;
wherein said plurality of portable cleaning modules further comprises:
a heater module capable of heating fluid to a predetermined temperature;
a vacuum module capable of vacuuming said fluid at least 60 cubic feet per minute;
at least one of said heater module or vacuum module being portable;
wherein said vacuum module comprises an automatic pump-out system for automatically pumping fluid out of said vacuum module when said fluid reaches a predetermined level in a fluid collection container;
wherein said automatic pump-out system further comprises:
a pump system;
at least one sensor for sensing when the fluid reaches a predetermined level;
a pump-out circuit coupled to said pump system and said at least one sensor for energizing said pump system to pump said fluid out of said fluid collection container when said at least one sensor senses that the fluid has reached said predetermined level;
wherein said system further comprises:
said at least one sensor comprising a first sensor for sensing when said fluid reaches a first predetermined level and a second sensor for sensing when said fluid reaches a second predetermined level;
said pump-out circuit being responsive to said first and second sensors for maintaining of said fluid maintained between said first and second predetermined levels;
wherein said first and second sensors are float sensors;
wherein said pump-out circuit is coupled to a vacuum motor and terminates power to said vacuum motor when said fluid is being pumped by said pump system;
wherein said pump-out circuit comprises:
a transformer,
a plurality of relays coupled to said transformer and said first and second sensors;
at least one switch coupled to and responsive to said transformer being energized and also coupled to said plurality of relays to terminate power to at least one vacuum motor in response to a signal received from at least one of said sensors.

28. The cleaning system as recited in claim 27 wherein said pump-out circuit further comprises a solenoid coupled to said pump and under the control of said pump-out circuit to permit said pump to pump fluid out of said fluid collection container.

29. A cleaning system comprising:

a plurality of portable cleaning modules;

said plurality of portable cleaning modules being usable either inside a vehicle or inside a building;

wherein said plurality of portable cleaning modules comprises a vacuum module comprising:

a receiving tank for receiving tank vacuumed waste water, said receiving tank comprising at least one wheel for facilitating transporting said receiving tank;

at least one vacuum motor for generating a vacuum in said tank;

at least one port for coupling said receiving tank to at least one vacuum hose;

said at least one vacuum motor generating a vacuum of at least 60 cubic feet per minute;

wherein said cleaning system comprises an automatic pump-out system for automatically pumping fluid out of said tank;

wherein said automatic pump-out system comprises:

at least one sensor for sensing when the fluid reaches a predetermined level;

a pump-out circuit coupled to said pump system and said at least one sensor for energizing said pump system to pump said fluid out of said fluid collection container when said at least one sensor senses that the fluid has reached said predetermined level;

wherein said cleaning system further comprises:

said at least one sensor comprising a first sensor for sensing when said fluid reaches a first predetermined level and a second sensor for sensing when said fluid reaches a second predetermined level;

said pump-out circuit being responsive to said first and second sensors for maintaining said fluid between said first and second predetermined levels; and wherein said pump-out circuit comprises:

a transformer, a plurality of relays coupled to said transformer and said first and second sensors;

at least one switch coupled to and responsive to said transformer being energized and also coupled to said plurality of relays to terminate power to at least one vacuum motor in response to a signal received from at least one of said sensors.

30. The cleaning system as recited in claim 29 herein said pump-out circuit further comprises a solenoid coupled to said pump and under the control of said pump-out circuit to permit said pump to pump fluid out of said collection container.

* * * * *